(12) United States Patent
Hatakeyama

(10) Patent No.: US 6,748,560 B2
(45) Date of Patent: *Jun. 8, 2004

(54) ADDRESS GENERATOR, INTERLEAVE UNIT, DEINTERLEAVER UNIT, AND TRANSMISSION UNIT

(75) Inventor: Izumi Hatakeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 09/994,137

(22) Filed: Nov. 26, 2001

(65) Prior Publication Data

US 2002/0035715 A1 Mar. 21, 2002

Related U.S. Application Data

(62) Division of application No. 09/283,188, filed on Apr. 1, 1999.

(30) Foreign Application Priority Data

Apr. 7, 1998 (JP) .......................... P10-094734
Apr. 30, 1998 (JP) .......................... P10-121533

(51) Int. Cl.⁷ .......................................... H03M 13/27
(52) U.S. Cl. ............................................ 714/702
(58) Field of Search ................................ 714/701, 702

(56) References Cited

U.S. PATENT DOCUMENTS 5,042,033 A * 8/1991 Costa .......................... 714/701
5,136,588 A * 8/1992 Ishijima ...................... 714/701
5,237,320 A * 8/1993 Sato et al. ................. 340/7.28
5,535,220 A * 7/1996 Kanno et al. ............... 714/701
5,590,353 A   12/1996 Sakakibara et al. ......... 395/800
6,064,664 A * 5/2000 Kim .......................... 370/335
6,185,200 B1 * 2/2001 Prasad ........................ 370/342
6,195,344 B1 * 2/2001 Prasad ........................ 370/335
6,298,369 B1 * 10/2001 Nguyen ...................... 708/620
6,321,311 B1 * 11/2001 Kim ........................... 711/157
6,452,985 B1 * 9/2002 Hatakeyama et al. ....... 375/341
6,507,629 B1 * 1/2003 Hatakeyama ............... 375/372

FOREIGN PATENT DOCUMENTS

EP  0047842  7/1981
EP  0282070  3/1988

* cited by examiner

Primary Examiner—Stephen M. Baker
(74) Attorney, Agent, or Firm—Jay H. Maioli

(57) ABSTRACT

An address generator for generating addresses in a prescribed order in the case of writing/reading data to/from a predetermined storage unit includes a first address data generator for generating a plurality of first address data which have predetermined address intervals, a second address data generator for generating a plurality of second address data representing sequentially shifted positions of the first address data one row by one row within address intervals, and an adder for generating addresses that have predetermined intervals by adding the second address data to the first address data.

3 Claims, 23 Drawing Sheets

| LINE SPEED | TRANSMISSION SPEED | NUMBER OF TIMES OF REPETITIONS | INPUT DATA COUNT IN INTERLEAVER | CONVOLUTIONAL CODING RATIO | CODED-ADDED DATA AMOUNT/20msec | ORIGINAL DATA | CRC CODE | TAIL BIT |
|---|---|---|---|---|---|---|---|---|
| 28800bps (576bit/20ms) | 9600 bps | 0 TIME | 576bit | 1/3 | 192 bit | 172 bit | 12 bit | 8 bit |
| | 4800 bps | 1 TIME | 288bit | | 96 bit | 80 bit | 8 bit | |
| | 2400 bps | 3 TIMES | 144bit | | 48 bit | 40 bit | --- | |
| | 1200 bps | 7 TIMES | 72bit | | 24 bit | 16 bit | --- | |

FIG. 6

| DECIMAL ADDRESS | BINARY | b0 | b1 | b2 | b3 | b4 | b5 | b6 | b7 | HEXADECIMAL |
|---|---|---|---|---|---|---|---|---|---|---|
| 0 | (0000000) | 001 | 002 | 003 | 004 | 005 | 006 | 007 | 008 | 0x00 |
| 1 | (0000001) | 033 | 034 | 035 | 036 | 037 | 038 | 039 | 040 | • |
| 2 | (0000010) | 065 | 066 | 067 | 068 | 069 | 070 | 071 | 072 | • |
| ⋮ | ⋮ | | | | ⋮ | | | | | ⋮ |
| 16 | (0010000) | | | | | | | | | 0x10 |
| 17 | (0010001) | 545 | 546 | 547 | 548 | 549 | 550 | 551 | 552 | 0x11 |
| 18 | (0010010) | 009 | 010 | 011 | 012 | 013 | 014 | 015 | 016 | 0x12 |
| 19 | (0010011) | 041 | 042 | 043 | 044 | 045 | 046 | 047 | 048 | • |
| 20 | (0010100) | | | | | | | | | • |
| ⋮ | ⋮ | | | | • | | | | | • |
| 31 | (0011111) | | | | • | | | | | • |
| 32 | (0100000) | | | | • | | | | | • |
| ⋮ | ⋮ | | | | • | | | | | |
| 35 | (0100011) | 553 | 554 | 555 | 556 | 557 | 558 | 559 | 560 | 0x23 |
| 36 | (0100100) | 017 | 018 | 019 | 020 | 021 | 022 | 023 | 024 | 0x24 |
| 37 | (0100101) | 049 | 050 | 051 | 052 | 053 | 054 | 055 | 056 | • |
| ⋮ | ⋮ | | | | • | | | | | • |
| | | | | | • | | | | | • |
| 52 | (0110100) | | | | | | | | | |
| 53 | (0110101) | 561 | 562 | 563 | 564 | 565 | 566 | 567 | 568 | 0x35 |
| 54 | (0110110) | 025 | 026 | 027 | 028 | 029 | 030 | 031 | 032 | 0x36 |
| 55 | (0110111) | 057 | 058 | 059 | 060 | 061 | 062 | 063 | 064 | • |
| ⋮ | | | | | • | | | | | • |
| | | | | | • | | | | | • |
| 70 | (1000110) | | | | | | | | | 0x46 |
| 71 | (1000111) | 569 | 570 | 571 | 572 | 573 | 574 | 575 | 576 | 0x47 |

FIG. 9

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 354 | 416 | 448 | 480 | 512 | 544 | 576 |

FIG. 10

| DECIMAL ADDRESS | | BINARY | b0 | b1 | b2 | b3 | b4 | b5 | b6 | b7 | HEXADECIMAL |
|---|---|---|---|---|---|---|---|---|---|---|---|
| | 0 | (0000000) | 001 | 002 | 003 | 004 | 005 | 006 | 007 | 008 | 0x00 |
| | 1 | (0000001) | 017 | 018 | 019 | 020 | 021 | 022 | 023 | 024 | 0x01 |
| | 2 | (0000010) | 033 | 034 | 035 | 036 | 037 | 038 | 039 | 040 | • |
| | • | • | | | | • | | | | | • |
| | • | • | | | | • | | | | | • |
| | • | • | | | | • | | | | | • |
| | • | | | | | • | | | | | 0x10 |
| | 16 | (0010000) | | | | | | | | | 0x11 |
| | 17 | (0010001) | 273 | 274 | 275 | 276 | 277 | 278 | 279 | 280 | 0x12 |
| | 18 | (0010010) | 009 | 010 | 011 | 012 | 013 | 014 | 015 | 016 | • |
| | 19 | (0010011) | 025 | 026 | 027 | 028 | 029 | 030 | 031 | 032 | • |
| | 20 | (0010100) | 041 | 042 | 043 | 044 | 045 | 046 | 047 | 048 | • |
| | • | | | | | • | | | | | • |
| | • | | | | | • | | | | | • |
| | • | | | | | • | | | | | |
| | 35 | (0100011) | 281 | 282 | 283 | 284 | 285 | 286 | 287 | 288 | 0x23 |

FIG. 11

| | | | | | | | | | | | | | | | | | |
|---|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 12

| | | | | | | | | | | | | | | | | | |
|---|---|---|---|---|---|---|---|---|---|---|---|---|---|---|---|---|---|
|1|9|17|25|33|41|49|57|65|73|81|89|97|105|113|121|129|137|
|1|9|17|25|33|41|49|57|65|73|81|89|97|105|113|121|129|137|
|1|9|17|25|33|41|49|57|65|73|81|89|97|105|113|121|129|137|
|1|9|17|25|33|41|49|57|65|73|81|89|97|105|113|121|129|137|
|2|10|18|26|34|42|50|58|66|74|82|90|98|106|114|122|130|138|
|2|10|18|26|34|42|50|58|66|74|82|90|98|106|114|122|130|138|
|2|10|18|26|34|42|50|58|66|74|82|90|98|106|114|122|130|138|
|2|10|18|26|34|42|50|58|66|74|82|90|98|106|114|122|130|138|
|3|11|19|27|35|43|51|59|67|75|83|91|99|107|115|123|131|139|
|3|11|19|27|35|43|51|59|67|75|83|91|99|107|115|123|131|139|
|3|11|19|27|35|43|51|59|67|75|83|91|99|107|115|123|131|139|
|3|11|19|27|35|43|51|59|67|75|83|91|99|107|115|123|131|139|
|4|12|20|28|36|44|52|60|68|76|84|92|100|108|116|124|132|140|
|4|12|20|28|36|44|52|60|68|76|84|92|100|108|116|124|132|140|
|4|12|20|28|36|44|52|60|68|76|84|92|100|108|116|124|132|140|
|4|12|20|28|36|44|52|60|68|76|84|92|100|108|116|124|132|140|
|5|13|21|29|37|45|53|61|69|77|85|93|101|109|117|125|133|141|
|5|13|21|29|37|45|53|61|69|77|85|93|101|109|117|125|133|141|
|5|13|21|29|37|45|53|61|69|77|85|93|101|109|117|125|133|141|
|5|13|21|29|37|45|53|61|69|77|85|93|101|109|117|125|133|141|
|6|14|22|30|38|46|54|62|70|78|86|94|102|110|118|126|134|142|
|6|14|22|30|38|46|54|62|70|78|86|94|102|110|118|126|134|142|
|6|14|22|30|38|46|54|62|70|78|86|94|102|110|118|126|134|142|
|6|14|22|30|38|46|54|62|70|78|86|94|102|110|118|126|134|142|
|7|15|23|31|39|47|55|63|71|79|87|95|103|111|119|127|135|143|
|7|15|23|31|39|47|55|63|71|79|87|95|103|111|119|127|135|143|
|7|15|23|31|39|47|55|63|71|79|87|95|103|111|119|127|135|143|
|7|15|23|31|39|47|55|63|71|79|87|95|103|111|119|127|135|143|
|8|16|24|32|40|48|56|64|72|80|88|96|104|112|120|128|136|144|
|8|16|24|32|40|48|56|64|72|80|88|96|104|112|120|128|136|144|
|8|16|24|32|40|48|56|64|72|80|88|96|104|112|120|128|136|144|
|8|16|24|32|40|48|56|64|72|80|88|96|104|112|120|128|136|144|

FIG. 14

| DECIMAL ADDRESS | | BINARY | b0 | b1 | b2 | b3 | HEXADECIMAL |
|---|---|---|---|---|---|---|---|
| | 0 | (0000000) | 001 | 002 | 003 | 004 | 0x00 |
| | 1 | (0000001) | 005 | 006 | 007 | 008 | 0x01 |
| | 2 | (0000010) | 009 | 010 | 011 | 012 | ⋮ |
| | ⋮ | ⋮ | | ⋮ | | | |
| | 16 | (0010000) | | | | | 0x10 |
| | 17 | (0010001) | 069 | 070 | 071 | 072 | 0x11 |

FIG. 15

| | | | | | | | | | | | | | | | | | |
|---|---|---|---|---|---|---|---|---|---|---|---|---|---|---|---|---|---|
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

FIG. 16

64-ary Orthogonal Symbol Set

FIG. 19

| 1  | 17 | 33 | 49 | 65 | 81 | 97  | 113 | 129 | 145 | 161 | 177 | 193 | 209 | 225 | 241 | 257 | 273 |
|----|----|----|----|----|----|-----|-----|-----|-----|-----|-----|-----|-----|-----|-----|-----|-----|
| 2  | 18 | 34 | 50 | 66 | 82 | 98  | 114 | 130 | 146 | 162 | 178 | 194 | 210 | 226 | 242 | 258 | 274 |
| 3  | 19 | 35 | 51 | 67 | 83 | 99  | 115 | 131 | 147 | 163 | 179 | 195 | 211 | 227 | 243 | 259 | 275 |
| 4  | 20 | 36 | 52 | 68 | 84 | 100 | 116 | 132 | 148 | 164 | 180 | 196 | 212 | 228 | 244 | 260 | 276 |
| 5  | 21 | 37 | 53 | 69 | 85 | 101 | 117 | 133 | 149 | 165 | 181 | 197 | 213 | 229 | 245 | 261 | 277 |
| 6  | 22 | 38 | 54 | 70 | 86 | 102 | 118 | 134 | 150 | 166 | 182 | 198 | 214 | 230 | 246 | 262 | 278 |
| 7  | 23 | 39 | 55 | 71 | 87 | 103 | 119 | 135 | 151 | 167 | 183 | 199 | 215 | 231 | 247 | 263 | 279 |
| 8  | 24 | 40 | 56 | 72 | 88 | 104 | 120 | 136 | 152 | 168 | 184 | 200 | 216 | 232 | 248 | 264 | 280 |
| 9  | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |

FIG. 20

| 1 | 9 | 17 | 25 | 33 | 41 | 49 | 57 | 65 | 73 | 81 | 89 | 97 | 105 | 113 | 121 | 129 | 137 |
|---|---|----|----|----|----|----|----|----|----|----|----|----|-----|-----|-----|-----|-----|
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |

FIG. 21

| 1 | 5 | 9  | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |

FIG. 22

ADDRESS GENERATOR, INTERLEAVE UNIT, DEINTERLEAVER UNIT, AND TRANSMISSION UNIT

This is a division of prior application Ser. No. 09/283,188 on Apr. 1, 1999.

BACKGROUND OF THE INVENTION

1. Field of the Invention

The present invention relates to an address generator, interleave unit, deinterleave unit, and transmission unit, and more particularly, is preferably applied to a radio communications system such as a portable telephone system.

2. Description of the Related Art

A radio communication system of this type is so structured that an area of communication service is divided into cells of a desired size and a base station is installed as a fixed radio station within each of the cells, and a portable telephone set serving as a mobile radio station communicates by radio with the base station of the cell in which it is located, thus implementing a so-called cellular system.

One of various communication systems between a portable telephone set and a base station is the code division multiple access (CDMA) system. The CDMA system assigns on the transmission side inherent pseudo random noise sequence (PN) codes composed of pseudo random series codes to each communication line and multiplies the PN code by the primary modulated signal, thereby diffusing the PN code over a wider bandwidth than the original frequency bandwidth (hereinafter referred to as the spread spectrum), and transmits the secondary modulated waves which have undergone the spread spectrum processing.

Such cellular system mobile station of the CDMA system adds cyclic redundancy check (CRC) codes to audio data at the time of transmission, performs convolutional coding (processing up to here is called encoding), and then, supplies thus obtained series of transmit symbols to an interleave processing circuit (hereinafter, referred to as an interleaver). The interleaver stores the series of transmit symbols in an internal memory in a prescribed write order, and reads out the series of transmit symbols in a read order different from the write order to rearrange the order of symbols at random, that is, performs interleave processing. The series of transmit symbols interleaved is modulated in a prescribed method and is transmitted as an analog transmit signal.

In addition, in the mobile station, each symbol of a series of receive symbols generated by converting the receive signal received at the time of reception into a digital signal is stored in the internal memory in a write order having the same pattern as the transmission side, and is read out in a read order different from the write order, to restore the order of symbols (hereinafter, referred to as deinterleaver). After this, the mobile station performs the Viterbi decoding and then error detection through the CRC codes.

In this case where the series of transmit symbols which have undergone the convolutional coding by the mobile station at the time of transmission does not have errors at random (uniform) in the transmission path but tends to cause burst (local) errors. If such burst errors exceed the error correction capability of the corresponding section, some errors remain uncorrected. To prevent such troubles, errors in the transmission path are distributed, so that the receiving side can efficiently perform error correction processing, by applying interleave processing to the series of transmit symbols.

When the above interleave processing is performed, in the interleaver 1 shown in FIG. 1, transmit symbol series data D16 which has been subjected to convolutional coding processing is supplied as input data to a first interleave memory 2 and a second interleave memory 3, eight bits by eight bits in parallel.

A memory switching controller 4 outputs a write address WA1 generated by a write address counter 5 to only the first interleave memory 2 via a first address selector 6. Accordingly, the first interleave memory 2 writes the transmit symbol series data D16 into a predetermined area in an eight-bit unit according to the write address WA1.

Although the write address WA1 is also outputted to a second address selector 10, the write address WA1 is not outputted to the second interleave memory 3 from the second address selector 10 because the second address selector 10 outputs read addresses under the control of the memory switching controller 4.

Next the memory switching controller 4 transmits a read address RA0 generated by a read address counter 8 of a read address generator 7 to an address conversion ROM 9. The address conversion ROM 9 converts the read address RA0 to a new read address RA1 specified to rearrange the write order to a random order according to the read address RA0, then outputs the address RA1 to only the first interleave memory 2 via the first address selector 6.

Here the read address RA1 is also outputted to the second address selector 10. The read address RA1 is not outputted to the second interleave memory 3 from the second address selector 10 because the second address sector 10 outputs the write address WA1 under the control of the memory switching controller 4.

The first interleave memory 2 reads the just written transmit symbol series data D16 in an eight-bit unit according to the read address RA1 and outputs the transmit symbol series data D16 as interleaved converted data D2 via a data selector 11. Since the read address RA1 is converted to a read address different from that used for write processing by the address conversion ROM 9, the interleaved converted data D2 is outputted.

The memory switching controller 4, while reading the interleaved converted data D2 from the first interleave memory 2, outputs the write address WA1 from the second address selector 10 to the second interleave memory 3 to write the next transmit symbol series data D16 in the predetermined area of the second interleave memory 3 in a eight-bit unit according to the write address WA1.

When the memory switching controller 4 finishes reading the converted data D2 from the first interleave memory 2, it switches the second address selector 10 to output the read address RA1, which is outputted from the read address generator 7, to the second interleave memory 3 via the second address selector 10. Accordingly, the second interleave memory 3 reads the just written transmit symbol series data D16 in an eight-bit unit according to the read address RA1 and outputs the transmit symbol series data D16 as interleaved converted data D3 via the data selector 11.

At this time, the memory switching controller 4, while reading interleaved converted data D3 from the second interleave memory 3, outputs the write address WA1 from the first address selector 6 to the first interleave memory 2. In this way, the memory switching controller 4 is so structured that, while it is reading the interleaved converted data D2 from the first interleave memory 2, it writes the transmit symbol series data D16 into the second interleave memory 3, and further, while it is reading the interleaved converted data D3 from the second interleave memory 3, writes the transmit symbol series data D16 into the first interleave memory 2, thus efficiently interleaving the input transmit symbol series data D16.

In this way, the conventional interleaver 1 needs to be provided with the address conversion ROM 9 in the read address generator 7 for interleave processing. The mobile station as a whole requires a deinterleaver (not shown) provided with the address conversion ROM 9 similar to that of the interleaver 1, in addition to the interleaver 1. As a result, the mobile station has a problem the amount of data to be stored in the address conversion ROM9 is large as the patterns of the write/read address patterns which are used for interleave/deinterleave processing increase with increase of data, resulting in larger circuit scale.

As shown in FIG. 2 where the same numerals are applied to parts corresponding to FIG. 1, in the interleaver 120, a read address RA3 generated by a read address counter 23 in a read address generator 121 is outputted to a first address selector 6 and a second address selector 10 and the read address RA3 is fed back to an address control circuit 22.

As a result, the address control circuit 22 newly generates the read address RA3 which has predetermined intervals by adding a predetermined value on the basis of the fed back read address RA3. The address control circuit 22 outputs the read address RA3 to the first address selector 6 and the second address selector 10 via the read address counter 23 and feeds back the read address RA3 to the address control circuit 22 again.

In this case also, the mobile station as a whole requires the read address generator 121 comprising the address control circuit 22 and the read address counter 23 in the interleaver 120, and requires a similar address control circuit and read address counter in a read address generator of a deinterleaver (not shown). Therefore, there was a problem that the processing of the address control circuit 22 become complicated as the patterns of the write/read address which are used for interleave/deinterleave processing increase.

In the interleavers 1 and 120, arrangement used when data is written into the first interleave memory 2 and the second interleave memory 3 may not be simply configured in eight-bit unit (one byte) depending on the interleave pattern. Such a case has a problem that a memory cannot be used efficiently.

Further, when the memory switching controller 4 executes interleave processing using the first interleave memory 2 and the second interleave memory 3 alternately, a plurality of interleave memories have to be provided. This is troublesome in that the total memory capacity increases, thus requiring larger circuits.

On the other hand, when only the first interleave memory 4 is used to execute interleave processing, the memory switching controller 4 first transmits the frame "0" data read from the first interleave memory 2 in read order different from the write order, which is used at the time of storing, to the transmitter 12 one bit by one bit. The memory switching controller 4 is so structured that it reads the last one-bit data of frame "0" from the first interleave memory 2 and outputs the data to the transmitter 12, then reads the first one-bit data of the next frame "1" from the first interleave memory 2 without interruption and outputs the data to the transmitter 12.

However, there occurs a problem that, for a very short period of time from when the memory switching controller 4 reads the last one-bit data of frame "0" from the first interleave memory 2 and outputs the data to the transmitter 12 until it reads the first one-bit data of the next frame "1" from the first interleave memory 2, the memory switching controller 4 may fail to perform encoding for storing into the first interleave memory 4 all transmit symbol series generated by adding CRC codes and applying convolutional coding to the audio data corresponding to the next frame "1."

Accordingly, there was a problem that, to perform encoding for the very short period of time, a faster clock has to be used, causing greater consumed power, or additional memory for encoding for the very short period of time has to be separately provided, thus requiring larger circuits.

SUMMARY OF THE INVENTION

In view of the foregoing, an object of this invention is to provide an address generator, interleave unit, and deinterleave unit which can generate addresses for outputting data in a randomly rearranged form with a simple construction.

Another object of the invention is to provide a transmission unit and a transmission method which can reduce memory capacity required for interleave processing.

The foregoing objects and other objects of the invention have been achieved by the provision of an address generator for generating addresses of an prescribed order predetermined for storage means in the case of writing data to the storage means or reading data from the storage means. The address generator comprises a first address data generating means for generating a plurality of first address data which have predetermined address intervals, a second address data generating means for generating second consecutive address data for the first address data every address interval, and an addition means for generating addresses which have predetermined intervals in order by sequentially adding the second address data to each piece of the first address data. This allows addresses, which have predetermined intervals, to be generated in order by using only the first address data generating means, the second address data generating means and the addition means with a simple construction, even when the address patterns for rearranging and outputting data in interleaved order increase.

Further, the present invention provides an interleave unit for rearranging and outputting for each frame in a random order symbols of transmit symbol series generated by coding original data. The interleave unit has an address generator comprising a first address data generating means for generating a plurality of first address data which have predetermined address intervals, a second address data generating means for generating second consecutive address data for the first address data every address interval, and an addition means for generating addresses which has predetermined intervals in order by seguentially adding the second address data to each piece of the first address data, and a control means for rearranging and outputting symbols of transmit symbol series in interleaved order by sequentially assigning addresses, which have predetermined intervals, to transmit symbol series. This allows addresses, which have predetermined intervals, to be generated in order by using the first address data generating means, the second address data generating means and the addition means with a simple construction, even the address patterns used by the interleave unit for rearranging and outputting transmit symbol series in interleaved order increase.

Further, the present invention provides a deinterleave unit for receiving transmit signals, in which the transmit signals comprising transmit data obtained by rearranging and outputting for each frame in interleaved order symbols of transmit symbol series generated by coding original data is subjected to a prescribed transmission processing and transmitted, and for rearranging symbols of received symbol series retrieved from the received signals into the original order. The deinterleave unit has an address generator comprising a first address data generating means for generating a plurality of first address data which have predetermined address intervals, a second address data generating means for generating second consecutive address data for the first address data every address interval, and an addition means for generating addresses, which have predetermined intervals, in order by sequentially adding the second address data to each piece of the first address data, and a control means for rearranging and outputting symbols of received symbol series into original order by sequentially assigning addresses, which have predetermined intervals, to received symbol series. This allows addresses, which have predetermined intervals, to be generated in order by using only the first address data generating means, the second address data generating means and the addition means with a simple construction, even when the address patterns used by the deinterleave unit for rearranging and outputting received symbol series in interleaved order increase.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a simple chart explaining conditions for transmit processing in the channel CODEC;

FIG. 9 is a simple chart showing the map configuration of the interleave memory at 9600 bps;

FIG. 10 is a simple chart showing a read order of converted data at 9600 bps;

FIG. 11 is a simple chart showing the map configuration of an interleave memory at 4800 bps;

FIG. 12 is a simple chart showing a read order of converted data at 4800 bps;

FIG. 14 is a simple chart showing a read order of converted data at 2400 bps;

FIG. 15 is a simple chart showing the map configuration of the interleave memory at 1200 bps;

FIG. 16 is a simple chart showing a read order of converted data at 1200 bps;

FIG. 19 is a simple chart showing a conversion table;

FIG. 20 is a simple chart explaining write/read processing to/from a memory at 4800 bps;

FIG. 21 is a simple chart explaining write/read processing to/from a memory at 2400 bps;

FIG. 22 is a simple chart explaining write/read processing to/from a memory at 1200 bps.

DETAILED DESCRIPTION OF THE EMBODIMENT

Figure 3:
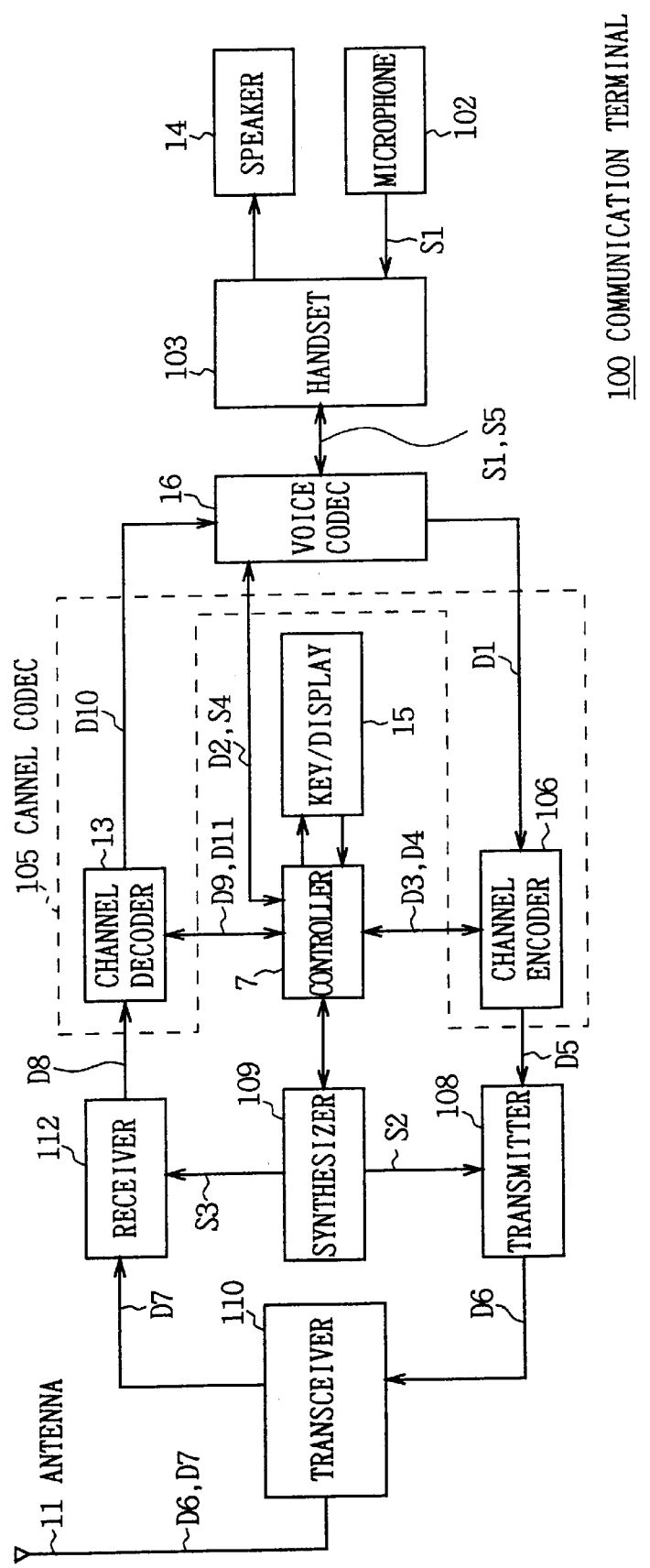
FIG. 3 is a block diagram showing the circuit configuration of a communication terminal according to one embodiment of the present invention.

Preferred embodiments of this invention will be described with reference to the accompanying drawings:

FIG. 3 shows a communication terminal 100 mounting an address generation unit according to the present invention as a whole. In conversations, an audio signal S1 gathered by a microphone 102 is interface-converted via a handset 103 and is transmitted to a voice CODEC 16. The voice CODEC 16 selects the transmission speed for the audio signal S1 out of the four types of 9600 bps, 4800 bps, 2400 bps, and 1200 bps, on the basis of the detection results obtained by detecting the circuit quality, quality of the audio signal S1 and the corresponding information quantity.

The voice CODEC 16 then generates audio data D1 by digitizing the audio signal S1 transmitted at a selected transmission speed and outputs the audio data D1 to a channel encoder 106 of a channel CODEC 105. The voice CODEC 16 generates speed information data D2 which represents the selected transmission speed whenever the transmission speed is selected, and transmits the speed information data D2 to a controller 7.

The controller 7 generates control data D3 corresponding to the transmission speed, which is represented by the speed information data D2, and transmits the control data D3 to the channel encoder 106. The channel encoder 106 executes transmission processing in accordance with the transmission speed based on the control data D3 and moreover, applies the convolutional coding processing to communication control data D4 supplied from the controller 7 under the state where the communication control data D4 has been attached to the audio data D1, and then transmits converted data D5 obtained by converting the resultant into a predetermined data format to a transmitter 108.

The transmitter 108, which is provided with a frequency control signal S2 for controlling transmission frequencies by a synthesizer 109, modulates the converted data D5 in a predetermined format on the basis of the frequency control signal S2 and transmits resultant transmit data D6 at a predetermined radio transmission speed to a base station (not shown) via a transceiver 110 and an antenna 11.

The base station also transmits data at any of transmission speeds of 9600 bps, 4800 bps, 2400 bps, and 1200 bps, the same as the above-mentioned transmit data D6. The communication terminal 100 receives signals transmitted by the base station via the antenna 11 and supplies the signals to a receiver 112 as receive data D7 via the transceiver 110.

A receiver 112, which is provided with frequency control signal S3 for controlling received frequencies by the synthesizer 109, demodulates the receive data D7 in a predetermined format on the basis of the frequency control signal S3 to generate demodulated data D8 and transmits the demodulated data D8 to a channel decoder 13 of the channel CODEC 105.

The channel decoder 13 is so structured that it controls the entire system on the basis of the control data D9, which is supplied from the controller 7, and executes receive processing of demodulated data D8 at any of received speeds of 9600 bps, 4800 bps, 2400 bps, and 1200 bps, the same as the base station being the transmission side. In this case the channel decoder 13 converts the demodulated data D8 in a predetermined format corresponding to the receive speed of the demodulated data D8 and moreover, applies error correction processing by the Viterbi decoding then decodes the demodulated data D8 to generate decoded data.

In addition, the channel decoder 13 transmits audio data D10 corresponding to voice of the communication party to the voice CODEC 16 out of the decoded data obtained by decoding the demodulated data D8 and transmits communication control data D11 out of the decoded data to the controller 7.

The voice CODEC 16 converts the audio data D10 into an analog audio signal S5 on the basis of the control signal S4, which is input from the controller 7, then transmits the analog audio signal S5 to a speaker 14 after applying interface-conversion via the handset 103. The communication terminal 100 is so structured that it is capable communicating by voice with the communication party by generating voice from the speaker 14.

The controller 7 generates communication control data D4 to be appended to the audio data D1 and decodes the communication control data D11 input from the channel decoder 13 to establish, cancel, or maintain calls and moreover, executes input/output (I/O) control of a key/display 15. In addition, the controller 7 controls the synthesizer 109 for generating transmit frequencies and receive frequencies.

Figure 4:
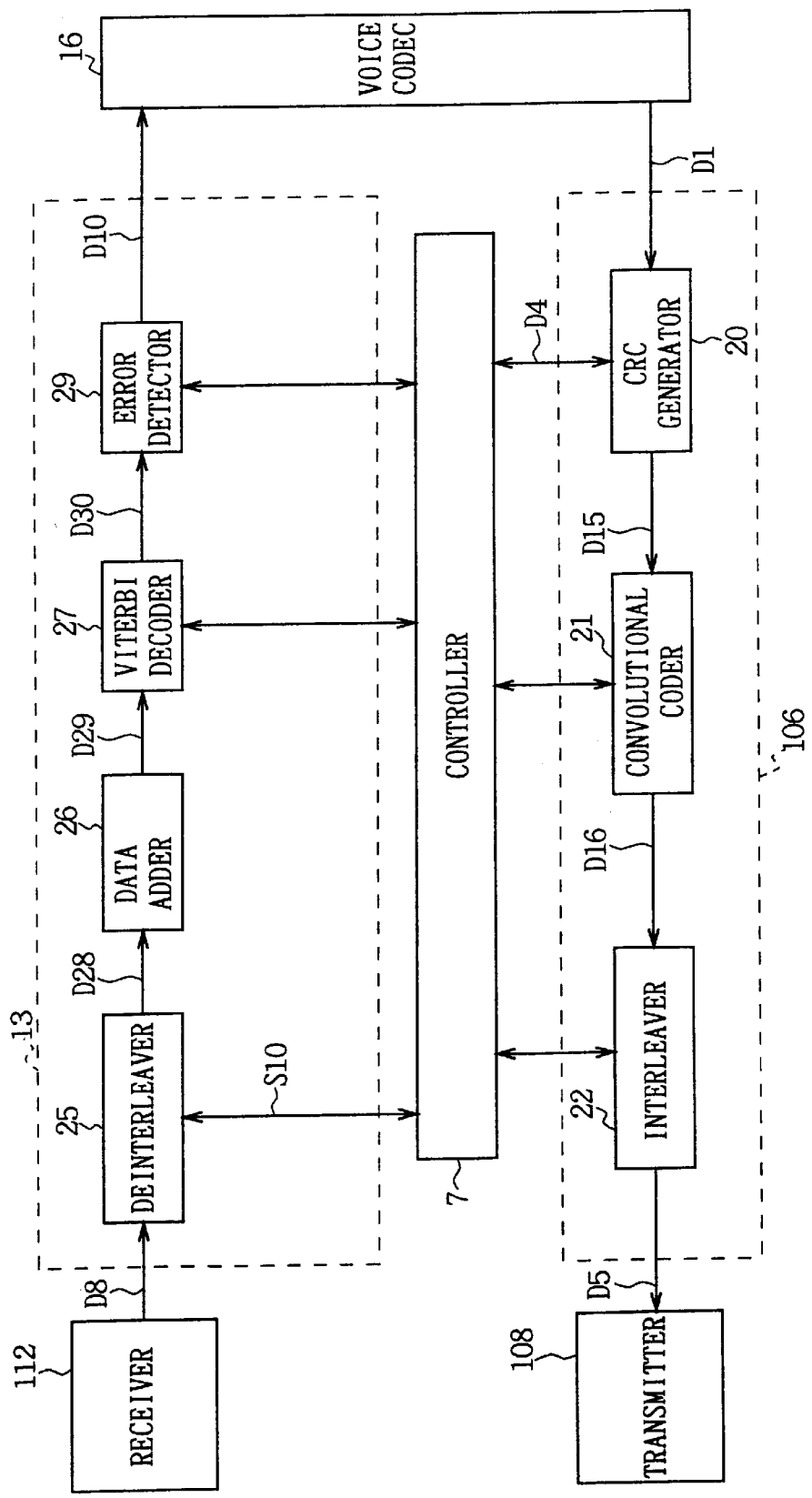
FIG. 4 is a block diagram showing the circuit configuration of a channel CODEC.
Figure 5:
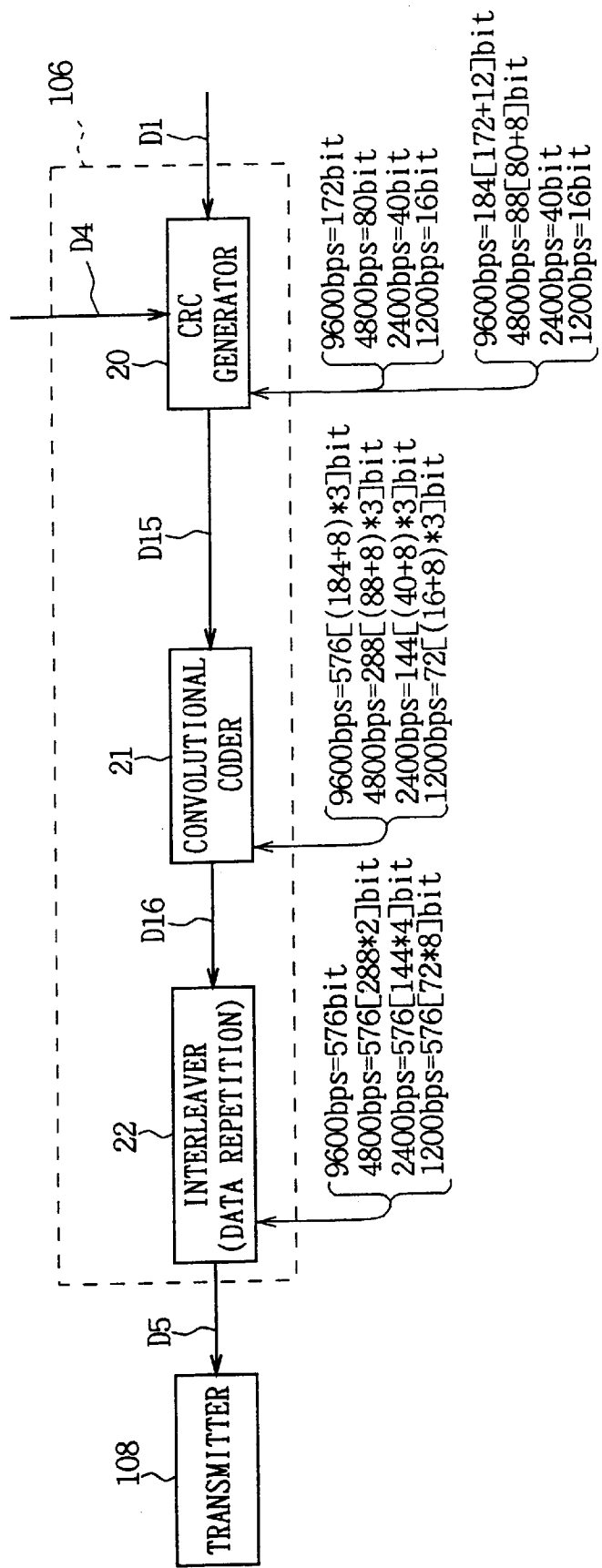
FIG. 5 is a block diagram explaining a transmit processing flow in the channel CODEC.

As shown in FIGS. 4 and 5 where the same reference numerals are applied to parts corresponding to FIG. 3, in the channel encoder 106 at data transmission, the audio data D1 transmitted at a transmission speed of 9600 bps, 4800 bps, 2400 bps, or 1200 bps is input to a CRC generator 20 from the voice CODEC 16.

The CRC generator 20, in the case of receiving the audio data D1 transmitted at a transmission speed of 9600 bps, generates total 172-bit original data by adding communication control data D4 supplied from the controller 7 to the audio data D1 and moreover, generates 184-bit data by generating 12-bit CRC codes using the generating polynomial G1(X) represented by the following equation (1) on the basis of the generated original data and adding the CRC codes to the original data.

$$G1(X) = X^{12} + X^{11} + X^{10} + X^9 + X^8 + X^4 + X + 1 \quad (1)$$

Then, the CRC generator 20 adds eight tail bits to the 184-bit data to generate 192-bit code-added data D15 and transmits it to a convolutional coder 21.

Further, the CRC generator 20, in the case of receiving the audio data D1 transmitted at the transmission speed of 4800 bps, generates total 80-bit original data by adding communication control data D4 supplied from the controller 7 to the audio data D1 and moreover, generates 88-bit data by generating 8-bit CRC codes using the generating polynomial G2(X) represented by the following equation (2) on the basis of the generated original data and adding the CRC codes to the original data.

$$G2(X) = X^8 + X^7 + X^4 + X^3 + X + 1 \quad (2)$$

The CRC generator 20 then adds eight tail bits to the 88-bit data to generate 96-bit code-added data D15 and transmits the 96-bit code-added data D15 to the convolutional coder 21.

Further, the CRC generator 20, in the case of receiving the audio data D1 transmitted at the transmission speed of 2400 bps, generates total 40-bit original data by adding communication control data D4 supplied from the controller 7 to the audio data D1 and moreover, adds eight tail bits consisting of all 0 to the generated original data to generate 48-bit code-added data D15 and transmits the 48-bit code-added data D15 to the convolutional coder 21.

Moreover, the CRC generator 20, in the case of receiving the audio data D1 transmitted at the transmission speed of 1200 bps, generates total 16-bit original data by adding communication control data D4 supplied from the controller 7 to the audio data D1 and moreover, adds eight tail bits consisting of all 0 to the generated original data to generate 24-bit code-added data D15 and transmits the 24-bit code-added data D15 to the convolutional coder 21.

The convolutional coder 21 is so structured that it performs convolutional coding of code-added data D15 for each transmission speed, which is generated by the CRC generator 20, on the basis of a preset constraint length k (in this embodiment, k=9), and a coding ratio R (in this embodiment, R=1/3) and transmits the resultant transmit symbol series data D16 to an interleaver 22.

The convolutional coder 21, in the case of receiving the 192-bit code-added data D15 transmitted at a transmission speed of 9600 bps, generates 576-bit transmit symbol series data D16 by performing convolutional coding based on the 192-bit code-added data D15. The convolutional coder 21, in the case of receiving the 96-bit code-added data D15 transmitted at a transmission speed of 4800 bps, generates 288-bit transmit symbol series data D16 by performing convolutional coding based on the 96-bit code-added data D15.

The convolutional coder 21, in the case of receiving the 48-bit code-added data D15 transmitted at a transmission speed of 2400 bps, generates 144-bit transmit symbol series data D16 by performing convolutional coding based on the 48-bit code-added data D15. The convolutional coder 21, in the case of receiving the 24-bit code-added data D15 transmitted at a transmission speed of 1200 bps, generates 72-bit transmit symbol series data D16 by performing convolutional coding based on the 24-bit code-added data D15.

For the interleaver 22, the number of data repetitions is set in advance for each transmission speed. The interleaver 22, in the case of receiving 576-bit transmit symbol series data D16 generated according to a transmission speed of 9600 bps, performs interleave processing by sequentially writing the 576-bit transmit symbol series data D16 without repetition into an interleave memory (not shown) provided therein in an eight-bit unit in accordance with a predetermined write address, then sequentially reading the transmit symbol series data D16 in an eight-bit unit in accordance with a predetermined read address, and transmits the resultant 576-bit converted data D5 at a line speed of 28800 bps (576 bits/20 msec) to a transmitter 108.

Further, the interleaver 22, in the case of receiving the 288-bit transmit symbol series data D16 generated according to a transmission speed of 4800 bps, generates 576-bit repetition data by using the data repeated once one bit by one bit (i.e., two sets of same data appear in succession). The interleaver 22 sequentially writes the 576-bit repetition data into the interleave memory provided therein in an eight-bit unit in accordance with a predetermined write address, and then sequentially reads the repetition data in an eight-bit unit in accordance with a predetermined read address to perform interleave processing. The interleaver 22 transmits the resultant 576-bit converted data D5 at a line speed of 28800 bps (576 bits/20 msec) to the transmitter 108.

Further, the interleaver 22, in the case of receiving 144-bit transmit symbol series data D16 generated according to a transmission speed of 2400 bps, generates 576-bit repetition data by using the data repeated three times one bit by one bit (i.e., four sets of same data appear in succession). Then, the interleaver 22 sequentially writs the 576-bit repetition data into the interleave memory provided therein in an right-bit unit in accordance with a predetermined write address, then sequentially reads the repetition data in an eight-bit units in accordance with a predetermined read address, to perform interleave processing. The interleaver 22 transmits the resultant 576-bit converted data D5 at a line speed of 28800 bps (576 bits/20 msec) to the transmitter 108.

Further, the interleaver 22, in the case of receiving 72-bit transmit symbol series data D16 generated according to a transmission speed of 1200 bps, generates 576-bit repetition data by using the data repeated seven times one bit by one bit (i.e., eight sets of same data appear in succession). The interleaver 22 sequentially writes the 576-bit repetition data into the interleave memory provided therein in eight-bit unit in accordance with a predetermined write address, then sequentially reads the repetition data in eight-bit unit in accordance with a predetermined read address to perform interleave processing. The interleaver 22 transmits the resultant 576-bit converted data D5 at a line speed of 28800 bps (576 bits/20 msec) to the transmitter 108.

As mentioned above, the interleaver 22 is so structured that it generates converted data D5 of seemingly same bit length (576 bits) as that obtained through interleave processing of transmit symbol series data D16 generated according to a transmission speed of 9600 bps by performing the above-mentioned data repetition processing and interleave processing on the transmit symbol series data D16 composed of three types of data count (288 bits, 144 bits and 72 bits) generated according to a transmission speed of 4800 bps, 2400 bps, and 1200 bps as shown in FIG. 6, and transmits the converted data D5 at a line speed of 28800 bps to the transmitter 108.

Figure 7:
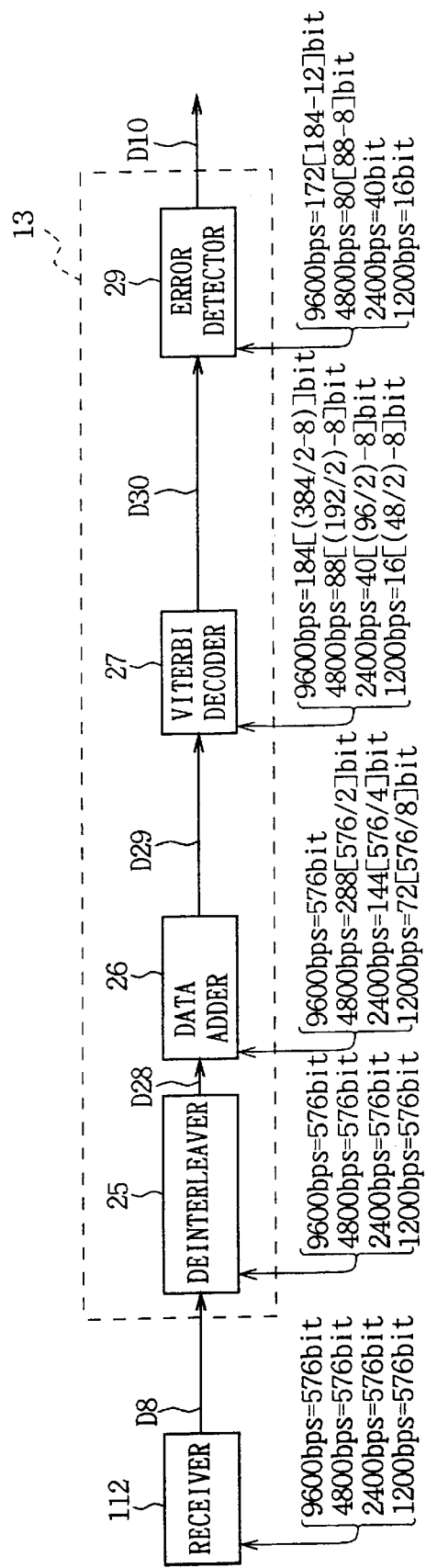
FIG. 7 is a block diagram explaining a receive processing flow in the channel CODEC.

On the other hand, referring to FIG. 4 and FIG. 7 where the same reference numerals are applied to parts corresponding to FIG. 3, the channel decoder 13, at data reception, inputs demodulated data D8 supplied from the receiver 112 to a deinterleaver 25.

The deinterleaver 25 sequentially stores the demodulated data D8 in a unit of 576-bit length (one cycle of transmission) into the internal deinterleave memory (not shown) and moreover, reads the demodulated data D8 in a unit of 576-bit length from the deinterleave memory. Here, the deinterleave memory is so structured that the demodulated data D8 is read from the deinterleave memory at a reception speed of 9600 bps, 4800 bps, 2400 bps, or 1200 bps according to the transmission speed used at the transmission side.

Additionally, the deinterleaver 25 rearranges 576-bit demodulated data D8 based on each reception speed using the precisely opposite procedure to that used for arranging the demodulated data D8 at the transmission side so as to recover the original order (hereinafter, referred to as a deinterleave). The resultant 576-bit soft determination data (hereinafter referred to as a first soft determination data) D28 is transmitted to the data adder 26.

The data adder 26 is so structured that it generates soft determination data (hereinafter referred to as second soft determination data) D29 composed of predetermined number of bits assumed before one-bit data is repeated a predetermined number of times for each reception speed on the basis of the first soft determination data D28. Thus the data adder 26, in the case of receiving the first soft determination data D28 at a reception speed of 9600 bps, transmits the first soft determination data D28 as the second soft determination data D29 to the Viterbi decoder 27 without data processing because the first soft determination data D28 has not undergone repetition processing.

The data adder 26, in the case of receiving the first soft determination data D28 at a reception speed of 4800 bps, generates 288-bit second soft determination data D29 by performing data addition on the basis of the first soft determination data D28 and transmits the second soft determination data D29 to the Viterbi decoder 27. The data adder 26, in the case of receiving the first soft determination data D28 at a reception speed of 2400 bps, generates 144-bit second soft determination data D29 by performing data addition on the basis of the first soft determination data D28 and transmits the second soft determination data D29 to the Viterbi decoder 27.

Further, the data adder 26, in the case of receiving the first soft determination data D28 at a reception speed of 1200 bps, generates 72-bit second soft determination data D29 by performing data addition on the basis of the first soft determination data D28 and transmits the second soft determination data D29 to the Viterbi decoder 27.

The Viterbi decoder 27 generates decoded data D30 (excluding eight tail bits) by using the Viterbi algorithm to perform the maximum likelihood decoding on the second soft determination data D29 input at each reception speed where the constraint length k is set to "9" and coding ratio R is set to "⅓," and transmits the decoded data D30 to an error detector 29.

Here, the Viterbi decoder 27, in the case of receiving the second soft determination data D29 at a reception speed of 9600 bps, generates 184-bit decoded data D30. The Viterbi decoder 27, in the case of receiving the second soft determination data D29 at a reception speed of 4800 bps, generates eighty eight-bit decoded data D30. The Viterbi decoder 27, in the case of receiving the second soft determination data D29 at a reception speed of 2400 bps, generates forty-bit decoded data D30. The Viterbi decoder 27, in the case of receiving the second soft determination data D29 at a reception speed of 1200 bps, generates 16-bit decoded data D30.

The error detector 29, in the case of receiving the decoded data D30 corresponding to a reception speed of 9600 bps, performs error detection of the decoded data D30 by using the generating polynomial G1(X) represented by the equation (1), removes twelve-bit data where CRC codes are assumed to be added from the decoded data D30, and transmits the resultant 172-bit audio data D10 to the voice CODEC 16.

The error detector 29, in the case of receiving the decoded data D30 corresponding to a reception speed of 4800 bps, performs error detection of the decoded data D30 by using the generating polynomial G2(X) represented by the equation (2), removes eight-bit data where CRC codes are assumed to be appended from the decoded data D30, and transmits the resultant eighty-bit audio data D10 to the voice CODEC 16.

Further, the error detector 29, in the case of receiving the decoded data D30 corresponding to a reception speed of 2400 bps, transmits forty-bit decoded data D30 as audio data D10 to the voice CODEC 16 without data processing because CRC codes are not added to the decoded data D30. Furthermore, the error detector 29, in the case of receiving the decoded data D30 corresponding to a reception speed of 1200 bps, transmits the decoded data D30 as sixteen-bit audio data D10 to the voice CODEC 16 without data processing because CRC codes are not appended to the decoded data D30 either.

Figure 1:
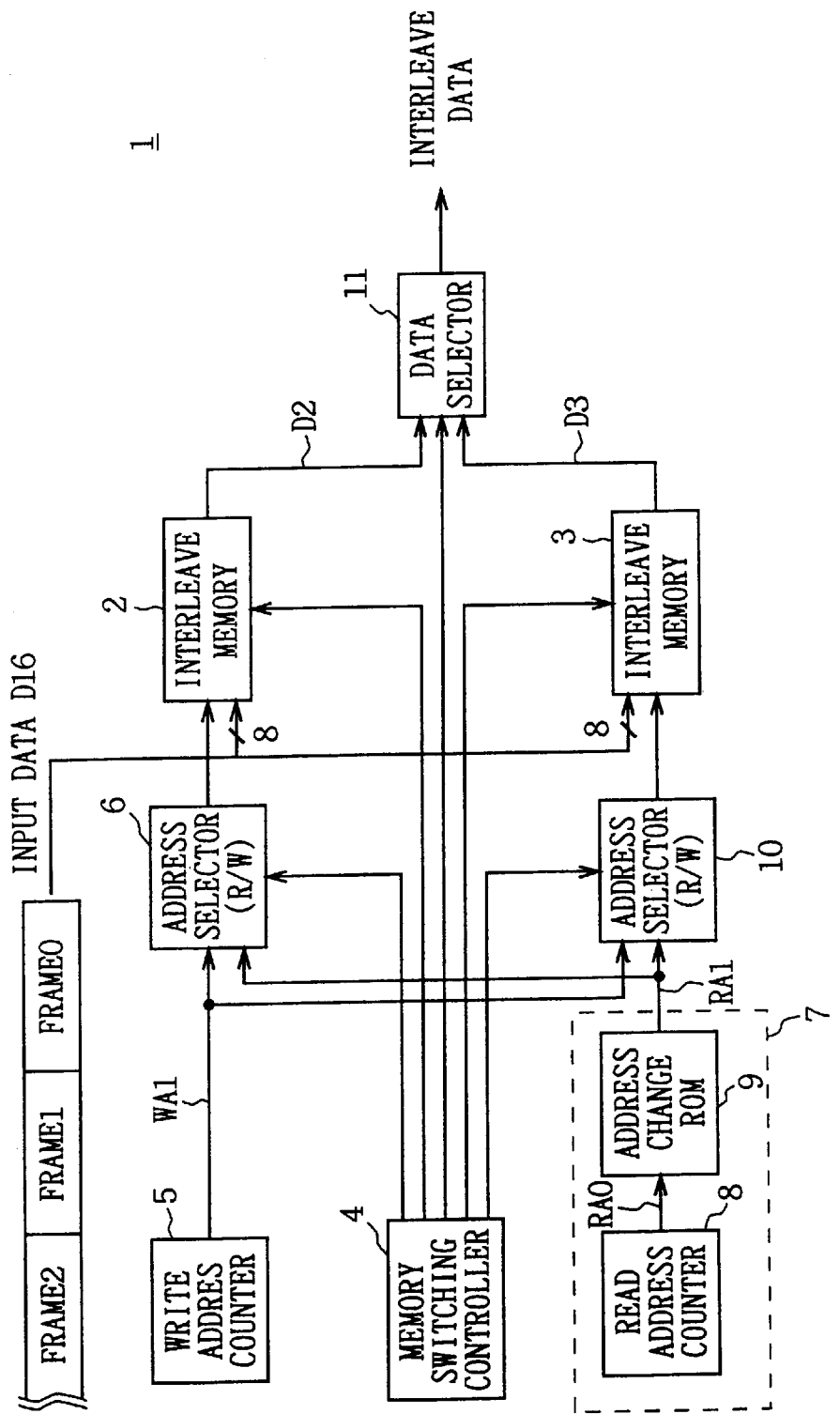
FIG. 1 is a block diagram explaining the conventional interleave method 1.
Figure 2:
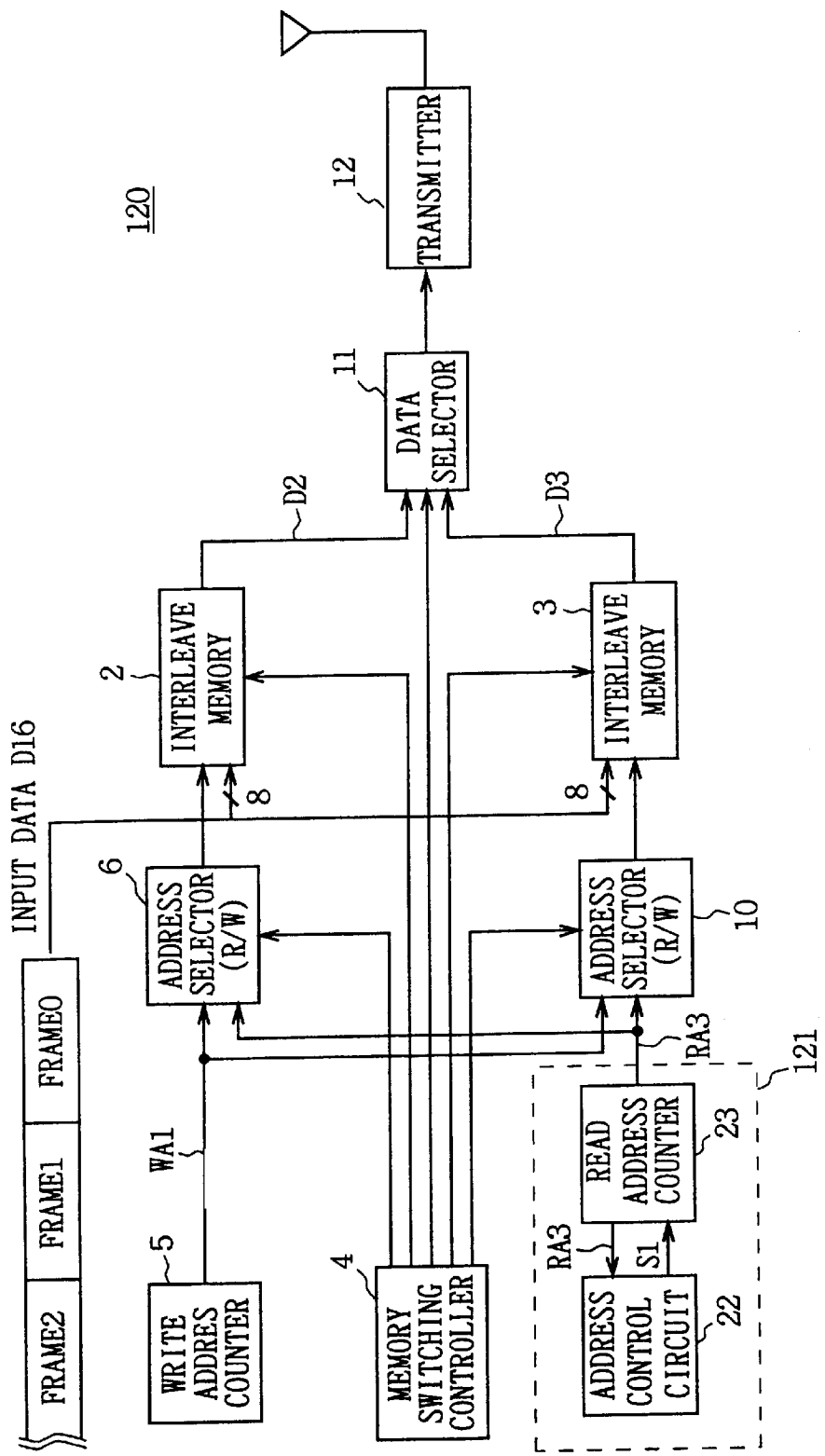
FIG. 2 is a block diagram explaining the conventional interleave method 2.
Figure 8:
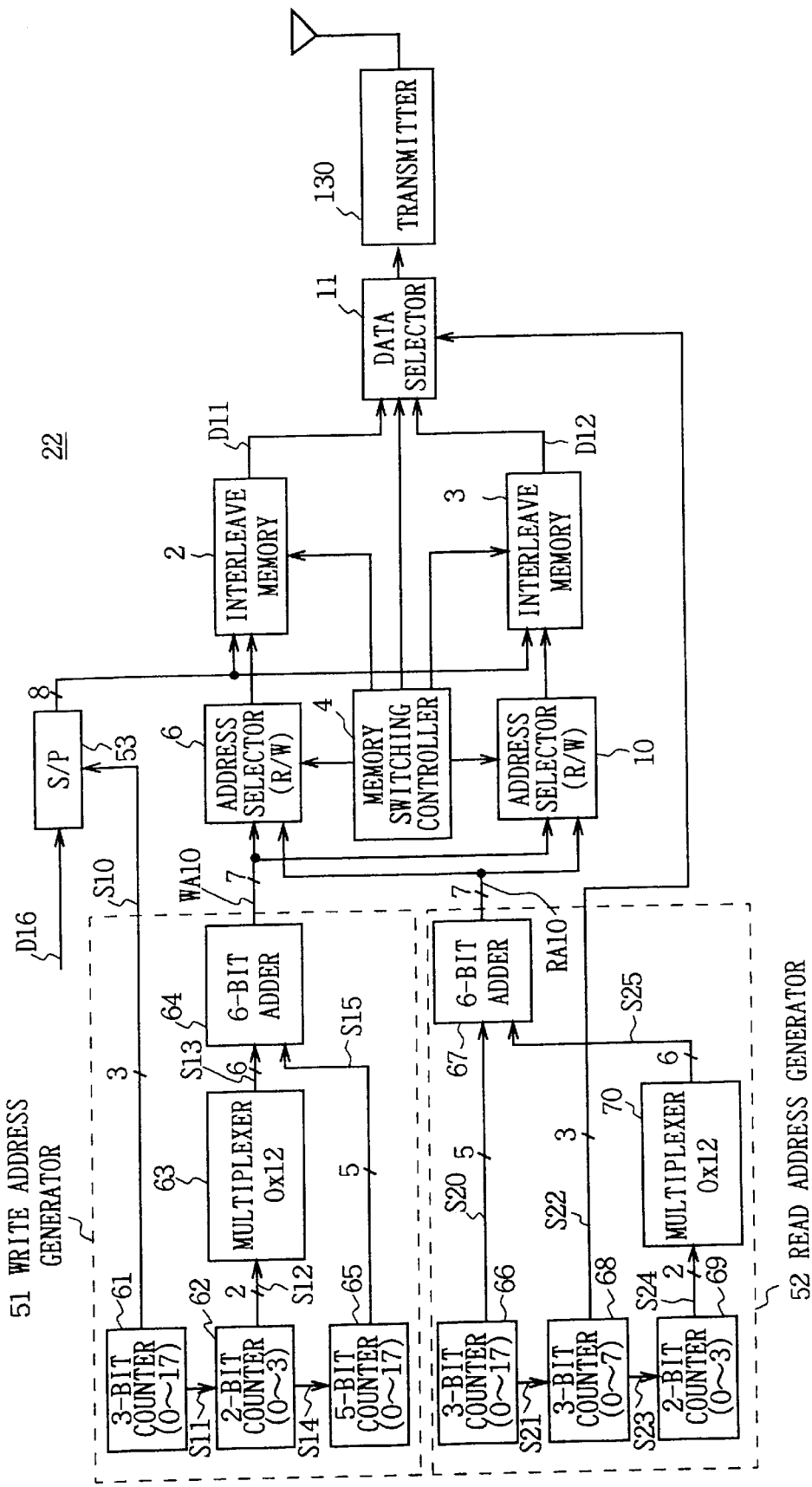
FIG. 8 is a block diagram showing the configuration of the interleaver.

Next, the interleaver 22 of the channel encoder 106 which is on the transmission side, as shown in FIG. 8 where the same reference numerals are applied to parts corresponding to FIGS. 1 and 2, has a write address generator 51 and a read address generator 52. The convolutional coded transmit symbol series data D16 is sequentially input over serial transmission to a serial-to-parallel converter 53.

The serial-to-parallel converter 53 is so structured that, when eight bits of transmit symbol series data D16 are input, uses a 3-bit clock signal S10 supplied from the write address generator 51 as a trigger to output the transmit symbol series data D16 in an eight-bit unit to a first interleave memory 2 and a second interleave memory 3.

The write address generator 51 transmits seven-bit write address WA10 to a first address selector 6 and a second address selector 10. A memory switching controller 4 is so structured that it switches between outputs from the first address selector 6 and the second address selector 10 and outputs the write address WA10 to only the first interleave memory 2 via the first address selector 6.

Although the write address WA10 is also outputted to the second address selector 10, the write address WA10 is not outputted from the second address selector 10 to the second interleave memory 3 because the memory switching controller 4 has switched control so that read addresses are outputted from the second address selector 10.

Accordingly, the first interleave memory 2 sequentially writes the transmit symbol series data D16 in an eight-bit unit in a write order at random, according to the write address WA10.

The read address generator 52 transmits seven-bit read address RA10 to the first address selector 6 and the second address selector 10. The memory switching controller 4 outputs the read address RA10 to only the first interleave memory 2 via the first address selector 6, by switching between outputs from the first address selector 6 and the second address selector 10.

Although the read address RA10 is also outputted to the second address selector 10, the read address RA10 is not outputted from the second address selector 10 to the second interleave memory 3 because the memory switching controller 4 has switched control so that write address WA10 is outputted from the second address selector 10.

Accordingly, the first interleave memory 2 sequentially reads the transmit symbol series data D16 in an eight-bit unit according to the read address RA10 of which order is different from that of the write address WA10, and transmits the transmit symbol series data D16 as read data D11 to a data selector 11. The data selector 11 is so structured that it outputs converted data D5, which has undergone one bit by one bit serial interleave processing, by specifying the bit position of the eight-bit read data D11 on the basis of three-bit address data S22 supplied from the read address generator 51.

The memory switching controller 4, while it is reading the converted data D11 from the first interleave memory 2, sequentially writes the transmit symbol series data D16 transmitted next into the second interleave memory 3 in an eight-bit unit in a write order at random in accordance with the write address WA10, by switching control so that the write address WA10 is outputted from the second address selector 10 to the second interleave memory 3.

The memory switching controller 4, when it finishes reading the converted data D11 from the first interleave memory 2, outputs the read address RA10, which is output from the read address generator 52, to the second interleave memory 3 via the second address selector 10, by switching the second address selector 10. Accordingly, the second interleave memory 3 reads the just written transmit symbol series data D16 in an eight bit unit in accordance with the read address RA10, and transmits the transmit symbol series data D16 as the read data D12 to the data selector 11.

The data selector 11 is so structured that it outputs the converted data D5, which has undergone one bit by one bit serial interleave processing, by specifying the bit position of the eight-bit read data D12 on the basis of three-bit address data S22 supplied from the read address generator 51.

The memory switching controller 4, while reading the read data D12 from the second interleave memory 3, outputs the write address WA10 from the first address selector 6 to the first interleave memory 2. Similarly, the memory switching controller 4 is so structured that it efficiently performs interleave processing of input transmit symbol series data D16 by writing the transmit symbol series data D16 into the second interleave memory 3 while reading the read data D11 from the first interleave memory 2, and by writing the transmit symbol series data D16 into the first interleave memory 2 while reading the read data D12 from the second interleave memory 3.

A transmitter 130 modulates the converted data D5 in a prescribed format, and transmits it to a base station (not shown) via an antenna at a prescribed radio transmission speed.

The write address generator 51 is so structured that it generates the write address WA10 at predetermined address intervals according to the capacity of the first interleave memory 2 and the second interleave memory 3, thus allowing data write order to be randomly rearranged.

The write address generator 51 is so structured that it generates the write address WA10 four times at intervals of 18 addresses in the case where the first interleave memory 2 and the second interleave memory 3 are configured by eight-bit memory which can store a maximum of 576 bits of data at a transmission speed of 9600 bps. Here, the first interleave memory 2 and the second interleave memory 3 are structured so as to write data in an eight bit (one byte) unit per address, thus storing a total of 576 bits of data into 72 addresses.

Thus, the write address generator 51, as shown in FIG. 9, sequentially generates address 0, address 18, address 36, and address 54 represented in decimal notation, then address 1, address 19, address 37, and address 55 at positions shifted by one row from the address 0, address 18, address 36, and address 54, then address 2, address 20, address 38, and address 56 at positions shifted by two rows from the address 0, address 18, address 36, and address 54, etc., until address 17, address 35, address 53, and address 71 at positions shifted by 17 rows from the address 0, address 18, address 36, and address 54, so as to generate a total of 72 types of write address WA10 at intervals of 18 addresses.

Here numbers "001" to "576" on the memory map indicates the write order of data to be written according to the write address WA10.

The write address generator 51 is so structured that it uses a 3-bit counter 61 to count values 0 through 7 in synchronism with the timing in which the transmit symbol series data D16 is input serially one bit by one bit into the serial-to-parallel converter 53.

Thus the 3-bit counter 61 is so structured that it transmits a counter output S10 to the serial-to-parallel converter 53 and moreover, supplies carry output (so-called carry signal) S11 to a 2-bit counter 62.

Accordingly, the serial-to-parallel converter 53, when the counter output S10 has reached "1,1,1" which represents seven, uses the counter output S10 as a trigger to the output transmit symbol series data D16 in an eight bit unit to the first interleave memory 2 and the second interleave memory 3.

The 2-bit counter 62 counts from 0 to 3 whenever the carry output S11 is given from the 3-bit counter 61, and transmits the two-bit address data S12 ("0,0" to "1,1") representing the count values 0 to 3 to the multiplier 63. Also the 2-bit counter 62 is so structured that it supplies a carry output S14 to a 5-bit counter 65 whenever it counts the count value 3.

A multiplier 63 generates six-bit address data S13 which has intervals of 18 addresses by multiplying each of two-bit address data S12 supplied from the 2-bit counter 62 by twelve in hexadecimal notation, i.e., by eighteen in decimal notation, then transmits the resultant six-bit address data S13 to a 6-bit adder 64.

The multiplier 63 is so structured that it does not actually perform multiplication but performs shifting of bits ($a_1,a_2$) of the two-bit data S12 to "$a_1,a_2,0,a_1,a_2,0$" to convert the two-bit data S12 to the six-bit address data S13, thus forming a shift arithmetic unit.

Accordingly, the two-bit address data S12 composed of "0,0" which represents the count value 0 is converted to the six-bit address data S13 composed of "0,0,0,0,0,0." Similarly, the two-bit address data S12 composed of "0,1" which represents the count value 1 is converted to the six-bit address data S13 composed of "0,1,0,0,1,0"; "1,0" which represents the count value 2 to the six-bit address data S13 composed of "1,0,0,1,0,0"; and "1,1" which represents the count value 3 to the six-bit address data S13 composed of "1,1,0,1,1,0."

That is, the multiplier 63 generates address 0 on the basis of the count value 0 supplied from the 2-bit counter 62, address 18 on the basis of the count value 1, address 36 on the basis of the count value 2, and address 54 on the basis of the count value 3. Here, the addresses 0, 18, 36, and 54 are in decimal notation and "0,0,0,0,0,0," "0,1,0,0,1,0," "1,0,0,1,0,0,1" and "1,1,0,1,1,0" respectively in binary notation.

The 5-bit counter 65 counts 0 to 17 whenever the carry output S14 is supplied from the 2-bit counter 62, and transmits the five-bit address data S15 ("0,0,0,0,0," to "1,0,0,0,1") representing the count values 0 to 17 to the 6-bit adder 64.

The 6-bit adder 64 is so structured that it generates the seven-bit write address WA10 by respectively adding the five-bit address data S15 representing count values 0 to 17 to the six-bit address data S13.

Actually, the 6-bit adder 64 generates the seven-bit write address WA10 composed of "0,0,0,0,0,0,0" representing address 0 by adding address data S15 composed of "0,0,0,0,0" representing the count value 0 output from the 5-bit counter 65 to the six-bit address data S13 composed of "0,0,0,0,0,0."

Then the 6-bit adder 64 generates the seven-bit write address WA10 composed of "0,0,1,0,0,1,0" representing address 18 by adding the address data S15 composed of "0,0,0,0,0" representing the count value 0 output from the 5-bit counter 65 to the six-bit address data S13 composed of "0,1,0,0,1,0."

Further the 6-bit adder 64 generates the seven-bit write address WA10 composed of "0,1,0,0,1,0,0" representing address 36 by adding the address data S15 composed of "0,0,0,0,0" representing the count value 0 output from the 5-bit counter 65 to the six-bit address data S13 composed of "1,0,0,1,0,0,", then generates the seven-bit write address WA10 composed of "0,1,1,0,1,1,0" representing address 54 by adding the address data S15 composed of "0,0,0,0,0" representing the count value 0 output from the 5-bit counter 65 to the six-bit address data 13 composed of "1,1,0,1,1,0."

Similarly, the 6-bit adder 64, when the count value 1 of the 5-bit counter 65 is input on the basis of the carry output S14 from the 2-bit counter 62, generates the write address WA10 composed of "0,0,0,0,0,0,1" representing address 1 shifted by one row from address 0, by adding the address data S15 composed of "0,0,0,0,1" representing the count value 1 to the six-bit address data S13 composed of "0,0,0, 0,0,0."

Then the 6-bit adder 64 generates the write address WA10 composed of "0,0,1,0,0,1,1" representing address 19 shifted by one row from address 18, by adding the address data S15 composed of "0,0,0,0,1" representing the count value 1 output from the 5-bit counter 65 to the six-bit address data S13 composed of "0,1,0,0,1,0.

Further, the 6-bit adder 64 generates the write address WA10 composed of "0,1,0,0,1,0,1" representing address 37 shifted by one row from address 36, by adding the address data S15 composed of "0,0,0,0,1" representing the count value 1 output from the 5-bit counter 65 to the six-bit address data S13 composed of "1,0,0,1,0,0", then generates the write address WA10 composed of "0,1,1,0,1,1,1" representing address 55 shifted by one row from address 54, by adding the address data S15 composed of "0,0,0,0,1" representing the count value 1 output from the 5-bit counter 65 to the six-bit address data S13 composed of "1,1,0,1,1,0."

Similarly, the 6-bit adder 64 is so structured that it sequentially generates address 2, address 20, address 38, and address 56, then address 3, address 21, address 39, and address 57, then address 4, address 22, address 40, and address 58, etc., until address 17, address 35, address 53, and address 71 as the write address WA10 by respectively adding the five-bit address data S15 representing the count values 2 to 17 to the six-bit address data S13.

Thus, the write address generator 51 transmits the write address WA10 generated at intervals of 18 addresses to the first address selector 6 and the second address selector 10. The memory switching controller 4 switches between the first address selector 6 and the second address selector 10 to supply the write address WA10 to the first interleave memory 2 or the second interleave memory 3, in synchronism with the timing in which the transmit symbol series data D16 is outputted in an eight bit unit from the serial-to-parallel converter 53.

Thus, the first interleave memory 2 or the second interleave memory 3 is so structured that it writes the transmit symbol series data D16 at intervals of 18 addresses in accordance with the write address WA10, at positions bit $b_0$ to bit $b_7$ ("001" to "576") in the direction of row in order.

On the other hand, the read address generator 52 is so structured that it generates the same read address RA10 as the write address WA10 in a different read order. The 5-bit counter 66 is so structured that it counts from 0 to 17 and transmits the count values as the five-bit address data S20 to the 6-bit adder 67, and supplies the carry output S21 to the 3-bit counter 68 when it has counted the count value 17.

The 3-bit counter 68 is so structured that it counts from 0 to 7 on the basis of the carry output S21 and transmits the count values as the three-bit address data S22 to the data selector 11, and supplies the carry output S23 to the 2-bit counter 69 when it has counted the count value 7.

The 2-bit counter 69 counts 0 to 3 according to the carry output S23, and transmits the count values as the two-bit address data S24 to a multiplier 70. The multiplier 70 generates six-bit address data S25 which has intervals of 18 addresses by multiplying the two-bit address data S24 by twelve in hexadecimal notation, i.e., by eighteen in decimal notation, then transmits the resultant six-bit address data S25 to the 6-bit adder 67.

The multiplier 70 is so structured that it does not actually perform multiplication but shifts bits $(a_1, a_2)$ of the two-bit address data S24 to "$a_1, a_2, 0, a_1, a_2, 0$" to convert the 2-bit data S24 to the six-bit address data S25, thus forming a shift arithmetic unit.

The 6-bit adder 67 generates the seven-bit read address RA10 which represents address 0 to address 71 in order by adding the five-bit address data S20 to the six-bit address data S25, and transmits the seven-bit read address RA10 to the first address selector 6 and the second address selector 10.

Actually, the read address generator 52 first supplies the three-bit address data S22 representing the count value 0 from the 3-bit counter 68 to the data selector 11, then supplies the five-bit address data S20 representing the count values 0 to 17 from the 5-bit counter 66 to the 6-bit adder 67.

In this case, the 2-bit counter 69 transmits two-bit address data S24 representing the count value 0 to the multiplier 70, because the carry output S23 is not supplied from the 3-bit counter 68. The multiplier 70 supplies the address data S25 composed of "0,0,0,0,0,0" to 6-adder 67 by multiplying two-bit address data S24 representing the count value 0 by twelve in hexadecimal notation, i.e., by eighteen in decimal notation.

The 6-bit adder 67 respectively generates the seven-bit read address RA10 representing addresses 0 to 17, by respectively adding the five-bit address data S20 representing the count values 0 to 17 to the address data S25 composed of "0,0,0,0,0,0," and transmits the seven-bit read address RA10 to the first address selector 6 and the second address selector 10.

The read address RA10 output to the first address selector 6 and the second address selector 10 is supplied to the first interleave memory 2 or the second interleave memory 3 under switching control by the memory switching controller 4. Thus the data at addresses 0 to 17 is sequentially read and output to the data selector 11. The data selector 11 then outputs only bit data placed at the bit position $b_0$ out of data at address 0 to 17, in the order of "001," "033," "065," etc., until "545" because the three-bit address data S22 representing the position of bit $b_0$ (count value: 0) in the direction of row is supplied from the 3-bit counter 68.

Then the read address generator 52 transmits the three-bit address data S22 representing the count value 1 from the 3-bit counter 68 to the data selector 11 on the basis of the carry output S21. In this case also, because the 3-bit counter 68 does not supply the carry output S23, the count value of the 2-bit counter 69 is not incremented and the six-bit address data S25 outputted from the multiplier 70 remains "0,0,0,0,0,0."

Same as the above processing, the 6-bit adder 67 generates the seven-bit read address RA10 representing addresses 0 to 17, by inputting the five-bit address data S20 representing the count values 0 to 17 from the 5-bit counter 66 and inputting the address S25 composed of "0,0,0,0,0,0" from the multiplier 70, then adding each of the address data S20 to the address data S25, then transmits the seven-bit read address RA10 to the first address selector 6 and the second address selector 10.

The read address RA10 output to the first address selector 6 and the second address selector 10 is supplied to the first interleave memory 2 or the second interleave memory 3 under switching control by the memory switching controller 4. Thus the data at addresses 0 to 17 is sequentially read and outputted to the data selector 11. The data selector 11 then outputs only bit data placed at the bit position $b_1$ out of data at addresses 0 to 17, in the order of "002," "034," "066," etc., until "546" because the three-bit address data S22 representing the position of bit $b_1$ (count value: 1) in the direction of row is supplied from the 3-bit counter 68.

As described above, the read address generator 52 is so structured that it generates eight times ($b_0$ to $b_7$) the seven-bit read address RA10 representing addresses 0 to 17, the same as the above processing, until the 3-bit counter 68 supplies the carry output S23 to the 2-bit counter 69. Whenever the read address RA10 is generated, the count value incremented by the 3-bit counter 68 is outputted to the data selector 11. Thus the data selector 11 is so structured that it outputs in order bit data placed at the bit positions $b_0$ to $b_7$ out of data at addresses 0 to 17, for each pit position on the basis of the three-bit address data S22 supplied from the 3-bit counter 68.

Then the read address generator 52 supplies the carry output data S23 to the 2-bit counter 69 because the 3-bit counter 68 has counted up to the count value 7. The two-bit address data S24 representing the count value 1 is then output from the 2-bit counter 69 to the multiplier 70.

The multiplier 70 generates six-bit address data S25 composed of "0,1,0,0,1,0" representing the address 18 by multiplying the address data S24 composed of "0,1" representing the count value 1 by twelve in hexadecimal notation, i.e., by eighteen in decimal notation, then transmits the resultant six-bit address data S25 to the 6-bit adder 67. The 6-bit adder 67 respectively generates the seven-bit read address RA10 representing the addresses 18 to 35, by respectively adding the five-bit address data S20 representing the count values 0 to 17 to the address data S25 composed of "0,1,0,0,1,0," and transmits the seven-bit read address RA10 to the first address selector 6 and the second address selector 10.

The data selector 11 then outputs bit data written at the bit position $b_0$ out of data at addresses 18 to 35, in the order of "009," "041," etc., until "553," because the three-bit address data S22 representing the position of bit $b_0$ (count value: 0) in the direction of row is supplied from the 3-bit counter 68.

In this way, the read address generator 52 is so structured that it generates eight times the seven-bit read address RA10 representing addresses 18 to 35 until the 3-bit counter 68 supplies the carry output S23 to the 2-bit counter 69. Whenever the read address RA10 is generated, the count value incremented by the 3-bit counter 68 is outputted to the data selector 11. Thus the data selector 11 is so structured that it outputs in order bit data placed at the bit positions $b_0$ to $b_7$ out of data at addresses 18 to 35, for each bit position on the basis of the three-bit address data S22 supplied from the 3-bit counter 68.

Then the read address generator 52, as mentioned above, generates the read address RA10 representing the addresses 36 to 53 and addresses 54 to 71 and transmits the read address RA10 to the first address selector 6 and the second address selector 10 and moreover, transmits the three-bit address data S22 representing the bit positions $b_0$ to $b_7$ to the data selector 11.

The data selector 11 is so structured that it outputs in order bit data at bit positions $b_0$ to $b_7$ out of data at addresses 36 to 53 for each position, and finally outputs in order bit data placed at bit positions $b_0$ to $b_7$ out of data at addresses 54 to 71 for each bit position. Thus the data selector 11 is so structured that it can output serially one bit by one bit the interleaved converted data D5.

As shown in FIG. 10, the converted data D5 is outputted in the order of data write position 1, 33, 65, etc., until 545, and 2, 34, 66, etc., until 546, and 3, 35, 67, etc., until 547, and 3, 2, 64, 96, etc., until 576.

When the first interleave memory 2 and the second interleave memory 3 store a maximum of 288 bits of data at a transmission speed of 4800 bps, the write address generator 51 is so structured that it generates the write address WA10 twice at intervals of 18 addresses.

Thus the write address generator 51, as shown in FIG. 11, generates the address 18 following address 0 represented in decimal notation, then generates address 1 and address 19 shifted by one row from the addresses 0 and 18, then generates address 2 and address 20 shifted by two rows from the addresses 0 and 18, etc., then finally generates address 17 and address 35 shifted by 17 rows from the addresses 0 and 18 thus generating total 36 types of the write address WA10 at intervals of 18 addresses.

Thus the write address generator 51 is so structured that it supplies the carry output S14 to the 5-bit counter 65 when the 2-bit counter 62 has counted from 0 to 1, transmitted the count values as the two-bit address data S12 ("0,0" and "0,1") to the multiplier 63, and incremented the count value by 1.

The read address generator 52 in this case is so structured that it generates the seven-bit read address RA10 representing addresses 0 to 35 in order, because the 2-bit counter 69 has counted from 0 to 1 and outputted the count values as the two-bit address data S22.

The read address generator 52 thus is so structured that it transmits the seven-bit read address RA10 to the first address selector 6 and the second address selector 10 and moreover, transmits the three-bit address data S22 representing the bit positions $b_0$ to $b_7$ to the data selector 11.

Thus the data selector 11 is so structured that it outputs in order bit data placed at bit positions $b_0$ to $b_7$ out of data at addresses 0 to 17 read on the basis of read address RA10, then outputs in order bit data placed at bit positions $b_0$ to $b_7$ out of data at addresses 18 to 35. This allows the data selector 11 to serially output interleaved converted data D5 one bit by one bit.

The converted data D5 is so structured that the same data is outputted twice under control of the data selector 11 by the memory switching controller 4. Accordingly, for the converted data D5, as shown in FIG. 12, data at addresses 1, 17, 33, 49, etc., until 273 in the first row is repeated twice, data at addresses 2, 18, 34, etc., until 274 in the third row is repeated twice, and data at addresses 16, 32, 48, etc., until 288 in the 31st row is repeated twice.

Figure 13:
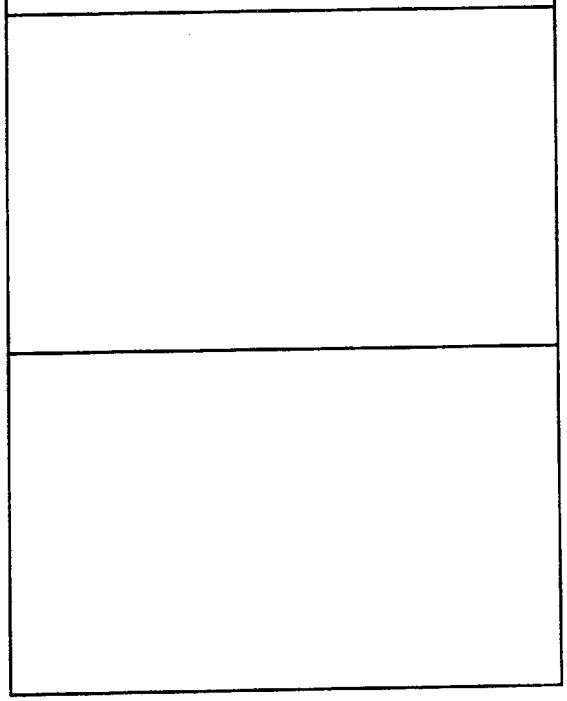
FIG. 13 is a simple chart showing the map configuration of the interleave memory at 2400 bps.
Figure 17:
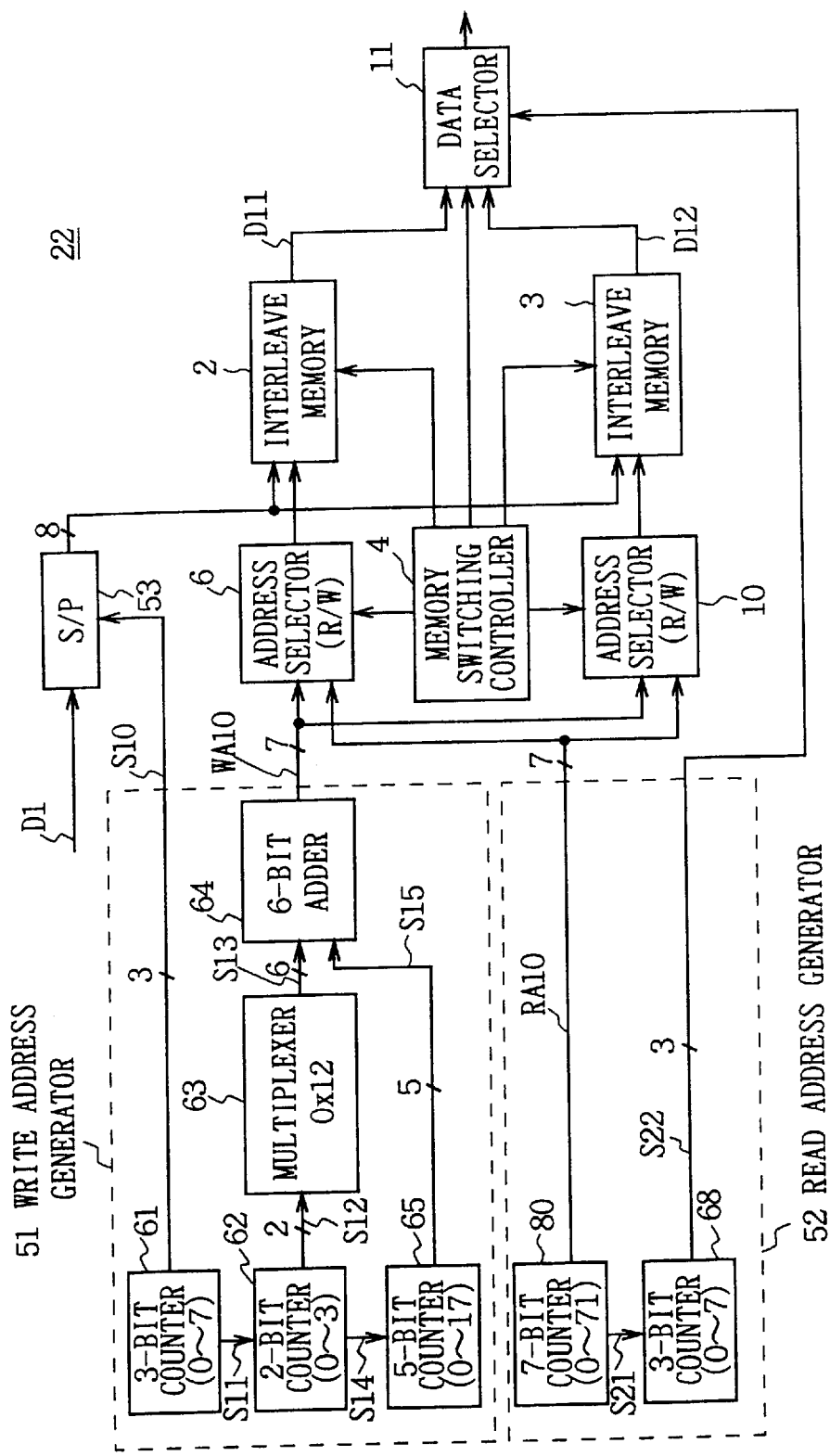
FIG. 17 is a block diagram showing the configuration of an interleaver in another embodiment.

When the first interleave memory 2 and the second interleave memory 3 store a maximum of 144 bits of data at a transmission speed of 2400 bps, the write address generator 51 is so structured that it generates the write address WA10 in order from address 0 to address 17, as shown in FIG. 13.

Thus the write address generator 51 is so structured that the 2-bit counter 62 counts from 0 and transmits the count value as the two-bit address data S12 ("0,0") to the multiplier 63, and supplies the carry output S14 to the 5-bit counter 65 whenever the count value 0 is incremented.

The read address generator 52 in this case is so structured that it generates the seven-bit read address RA10 representing addresses 0 to 17 in order, because the 2-bit counter 69 has counted 0 and output the count value as the two-bit address data S24.

The read address generator 52 thus is so structured that it transmits the seven-bit read address RA10 to the first address selector 6 and the second address selector 10 and moreover, transmits the three-bit address data S22 representing bit positions $b_0$ to $b_7$ to the data selector 11.

Thus the data selector 11 is so structured that it outputs in order bit data placed at bit positions $b_0$ to $b_7$ out of data at addresses 0 to 17 read on the basis of read address RA10 for each bit position. This allows the data selector 11 to serially output interleaved converted data D5 one bit by one bit.

The converted data D5 is so structured that the same data is outputted four times under control of the data selector 11 by the memory switching controller 4. Accordingly, for the converted data D5, as shown in FIG. 14, data at addresses 1, 9, 17, etc., until 137 in the first row is repeated four times, data at addresses 2, 10, 18, etc., until 138 in the fifth row is repeated four times, and data at addresses 8, 16, 24, etc., until 144 in the 29th row is repeated four times.

When the first interleave memory 2 and the second interleave memory 3 store a maximum of 72 bits of data at a transmission speed of 1200 bps, the write address generator 51 is so structured that it generates the write address WA10 in order from address 0 to address 17, as shown in FIG. 15.

The write address generator 51 in this case is so structured that it supplies the carry output S11 to the 2-bit counter 62 when the 3-bit counter 61 has counted from 0 to 3 and output the counter output S10 and counted 3. In the write address generator 51, the 2-bit counter 62 count 0 and transmits the two-bit address data S12 ("0,0") representing the count value 0 to the multiplier 63, and supplies the carry output S14 to the 5-bit counter 65 whenever the count value 0 is incremented.

In this case, in the read address generator 52, the 3-bit counter 68 counts from 0 to 3 and outputs the count values as the address data S22, and supplies the carry output S23 to the 2-bit counter 69 when the 3-bit counter counts 3. The read address generator 52 is so structured that the 2-bit counter 69 counts 0 and outputs the count value as the address data S24, thus generating the seven-bit read address RA10 representing addresses 0 to 17 in order.

The read address generator 52 thus is so structured that it transmits the seven-bit read address RA10 to the first address selector 6 and the second address selector 10 and moreover, transmits the three-bit address data S22 representing bit positions $b_0$ to $b_3$ to the data selector 11.

Thus the data selector 11 is so structured that it outputs in order bit data placed at bit positions $b_0$ to $b_3$ out of data at addresses 0 to 17 read on the basis of the read address RA10 for each bit position. This allows the data selector 11 to serially output interleaved converted data D5 one bit by one bit.

The converted data D5 is so structured that the same data is outputted eight times under control of the data selector 11 by the memory switching controller 4. Accordingly, for the converted data D5, as shown in FIG. 16, data at addresses 1, 5, 9, etc., until 69 in the first row is repeated eight times, data at addresses 2, 6, 10, etc., until 70 in the ninth row is repeated eight times, and data at addresses 4, 8, 12, etc., until 72 in the 25th row is repeated eight times.

In the above configurations, the write address generator 51 generates a plurality of address data S13 which have predetermined address intervals by using the multiplier 63 to multiply each pieces of address data S12 output from the 2-bit counter 62 by predetermined number, uses the 5-bit counter 65 to generate consecutive address data S15 for address data S13 at predetermined address intervals, uses the 6-bit adder 64 to sequentially add address data S15 to each of address data S13, thus generating write address WA10 in order at predetermined intervals which is composed of patterns allowing storage of all data in the first interleave memory 2 and the second interleave memory 3.

The write address generator 51 can be simply composed of a 2-bit counter 62, a multiplier 63, a 5-bit counter 65, and an adder 64 when generating 72 types of write address WA10 corresponding to the capacity of data to be stored in the first interleave memory 2 and the second interleave memory 3. Unlike prior art, troubles can be evaded such as larger circuit size or complicated processing needed to generate addresses which have predetermined intervals, when the address conversion ROM 9 (FIG. 1) or address control circuit 22 (FIG. 2) is used.

Further, in this case, The multiplier 63 of the first address generator does not actually perform multiplication but performs shifting of bits of the address data S12 output from the 2-bit counter 62 to obtain the same results as multiplication. Thus the multiplier 63 only needs to configure a shift arithmetic unit, allowing a simpler configuration.

In the read address generator 52 also, a simple configuration where the connection status is changed by using an address 5-bit counter 66, a 2-bit counter 69, a multiplier 70, and an adder 67 which are identical those of the write address generator 51 allows the read address RA10 identical to the write address WA10 to be generated in read order different from write order of the write address WA10.

According to the above configuration, the write address generator 51 can generate the write address WA10 which have predetermined intervals in order through a simple configuration and a simple processing, by using the 2-bit counter 62 and the multiplier 63 to generate a plurality of address data S13 which have predetermined address intervals, by using the 5-bit counter 65 to generate consecutive address data S15 for address data S13 which have predetermined address intervals, and by using the 6-bit adder 64 to sequentially add address data S15 to each of address data S13.

Note that, in the above embodiment, the write address generator 52 generates write address WA10 at intervals of 18 addresses and the read address generator 52 generates in order addresses 0 to 71 of the read address RA10. However, the present invention is not limited to this embodiment but the write address WA10 can be generated in order from address 0 to address 71 and the read address RA10 can be generated in rearranged order at intervals of 18 addresses.

Further, in the above embodiment, the address generator of the present invention is used as an interleaver 22 of the channel encoder 106 at the transmission side. However, the present invention is not limited to this embodiment but the address generator of the present invention can be used as a deinterleaver 25 of the channel decoder 13 at the reception side. In this case the write address and read address have to be generated so that the order rearranged by the interleaver 22 at the transmission side is restored to the original order.

Further, in the above embodiment, the interleaver 22 as an interleave unit is composed of the write address generator 51 serving as an address generator, the memory switching controller 4 as control means, the first address selector 6 and the second address selector 10, and the first interleave memory 2 and the second interleave memory 3. However, the present invention is not limited to this embodiment but an interleave unit can be composed of an address generator comprising the read address generator whose configuration is the same as that of the write address generator 51, and the control means, and a deinterleave unit can be also similarly structured.

Moreover, in the above embodiment, the transmit symbol series data D16 is outputted in an eight-bit unit via the parallel-to-serial converter 53 for storage in the interleave memories 6 and 10. However, the present invention is not limited to this embodiment but data can be stored in a unit of predetermined number of bits, depending on the configuration of the interleave memories 6 and 10.

Further, in the above embodiment, the read address generator 52 as an address generator is composed of the first address generating means consisting of the 2-bit counter 62 as the first counter and the multiplier 63, the second address generating means consisting of the 5-bit counter, and the addition means consisting of the 6-bit adder 64. However, the present invention is not limited to this embodiment but, as long as addresses which have predetermined intervals can be generated, the first address generating means can be composed of a counter means for generating six-bit address data, an addition means for generating and outputting the first address data by adding particular address values which have predetermined intervals to the six-bit address data, and the storage means for temporarily storing the first address data, and addresses have predetermined intervals can be generated by sequentially adding particular address values to the first address data sequentially stored in the storage means, and various other configurations can be employed to form the first address generating means.

Furthermore, in the above embodiment, six-bit address data S13 which have intervals of 18 addresses is generated by multiplying each of two-bit address data S12 by twelve in hexadecimal notation, i.e., by eighteen in decimal notation with the multiplier 63. However, the present invention is not limited to this embodiment but, as long as bit shift is available, six-bit address data S13 which have intervals of 9 addresses can be generated by multiplying each of two-bit address data S12 by nine, and also six-bit address data S13 which have predetermined intervals can be generated by using various other multipliers which cannot perform bit-shifting.

Figure 18:
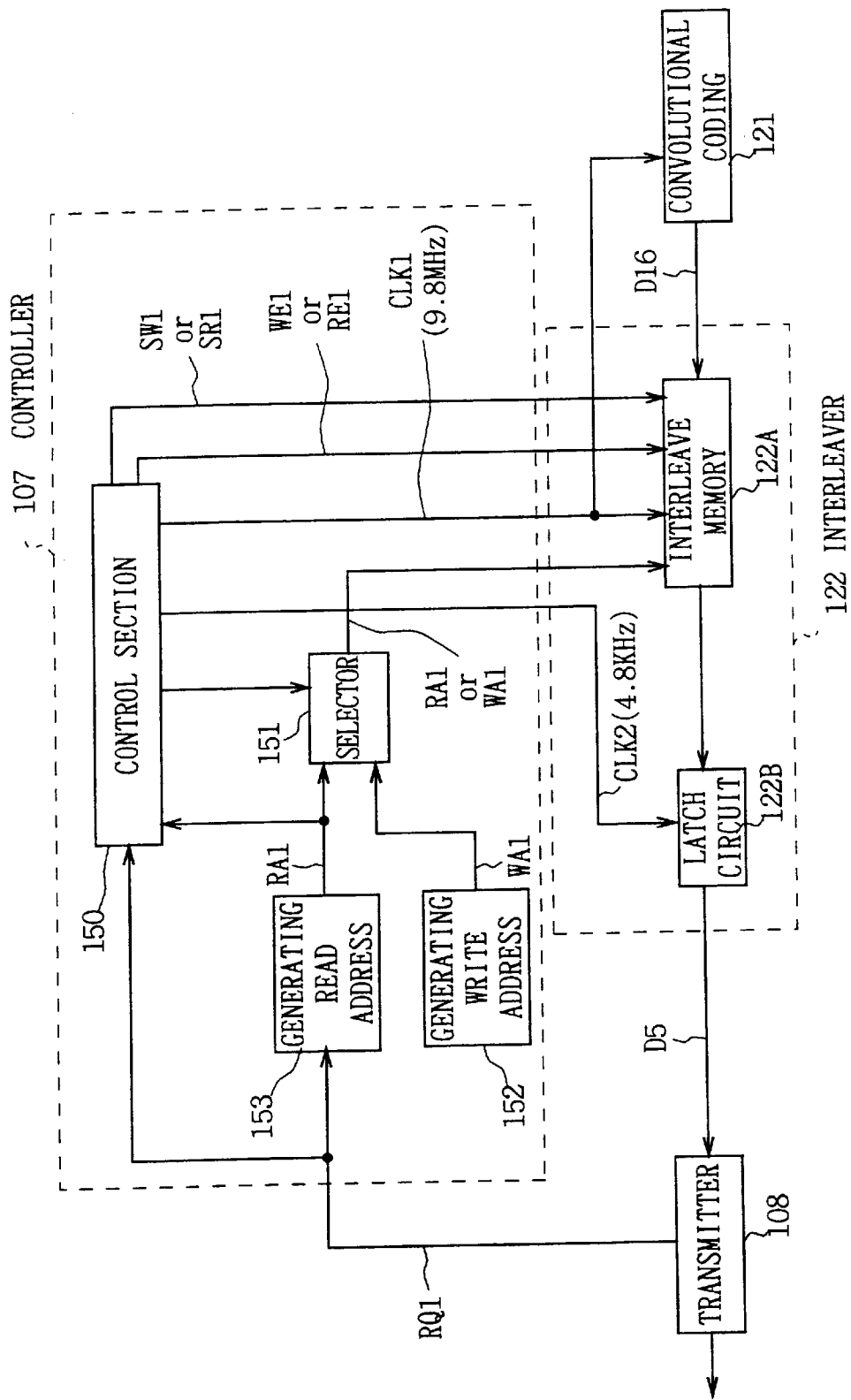
FIG. 18 is a block diagram showing the configuration of a controller and an interleaver.

Next, the interleave processing method in which one interleave memory is used in the interleaver 122 of the channel encoder 106 at the transmission side will be explained. As shown in FIG. 18, a control section 150 of a controller 107 controls operation speed of an interleave memory 122A and a latch circuit 122B so as to make the interleave memory 122A perform write/read processing every clock CLK1 of 9.8 MHz and to make the latch circuit 122B output latched converted data D5 every clock CLK2 of 4.8 kHz.

When writing transmit symbol series data D16 supplied from the convolutional coder 121 into the interleave memory 122A of the interleaver 122, the control section 150 of the controller 107, based on the input timing of a request signal RQ1 transmitted from a transmitter 108, outputs to the interleave memory 122A the write signal SW1 and the write enable signal WE1 which indicates the write enable state and moreover, outputs the write address information WA1 generated by a write address generator 152 to the interleave memory 122A via the selector 151.

The control section 150 use the clock CLK to start reading the transmit symbol series data D16 from the convolutional coder 121 and moreover, sequentially writes the transmit symbol series data D16 for a single cycle (576 bits/20 msec.) one bit by one bit into a predetermined position of the interleave memory 122A, based on the write address information WA1 synchronized with the clock CLK1 of 9.8 MHz.

Next, in the case of reading the transmit symbol series data D16 of a single cycle written into the interleave memory 122A, the control section 150, based on the input timing of a request signal RQ1 transmitted from a transmitter 108, switches the write signal SW1 to the read signal SR1 and outputs the read signal SR1 to the interleave memory 122A and moreover, outputs to the interleave memory 122A the read enable signal RE1 which indicates the read enable state, and at the same time outputs the read address information RA1 generated by a read address generator 153 to the interleave memory 122A via the selector 151.

The interleave memory 122A, based on the read address information RA1 synchronized with the clock CLK1 of 9.8 MHz, reads at a time six-bit symbol series data D16 as the converted data D5 then transmits the symbol series data D16 to the transmitter 108. The control section 150 holds using the latch circuit 122B, based on the clock CLK2 of 4.8 kHz, the six-bit converted data D5 read from the interleave memory 122A, and keeps holding the same six-bit converted data D5 until it supplies the next clock CLK2 to the latch circuit 122B.

In this way, the interleaver 122 is so configured that it uses the control by the control section 150 to set a write/read processing speed of the interleave memory 122A to a high rate (9.8 MHz), and sets a processing speed of outputting the six-bit converted data D5 from the latch circuit 122B to a low rate (4.8 kHz), and sequentially outputs to the transmitter 108 the six-bit converted data D5 output at a time from the latch circuit 122B.

The transmitter 108, based on the six-bit converted data D5 supplied from the latch circuit 122B, calculates the symbol index SI represented by the following equation (3):

$$Id \times N_0 = C_0 + 2C_1 + 4C_2 + 8C_3 + 16C_4 + 32C_5 \quad (3)$$

where six-bit converted data D5 is input to $C_0$, $C_1$, $C_2$, $C_3$, $C_4$, and $C_5$, respectively.

Figure 19:
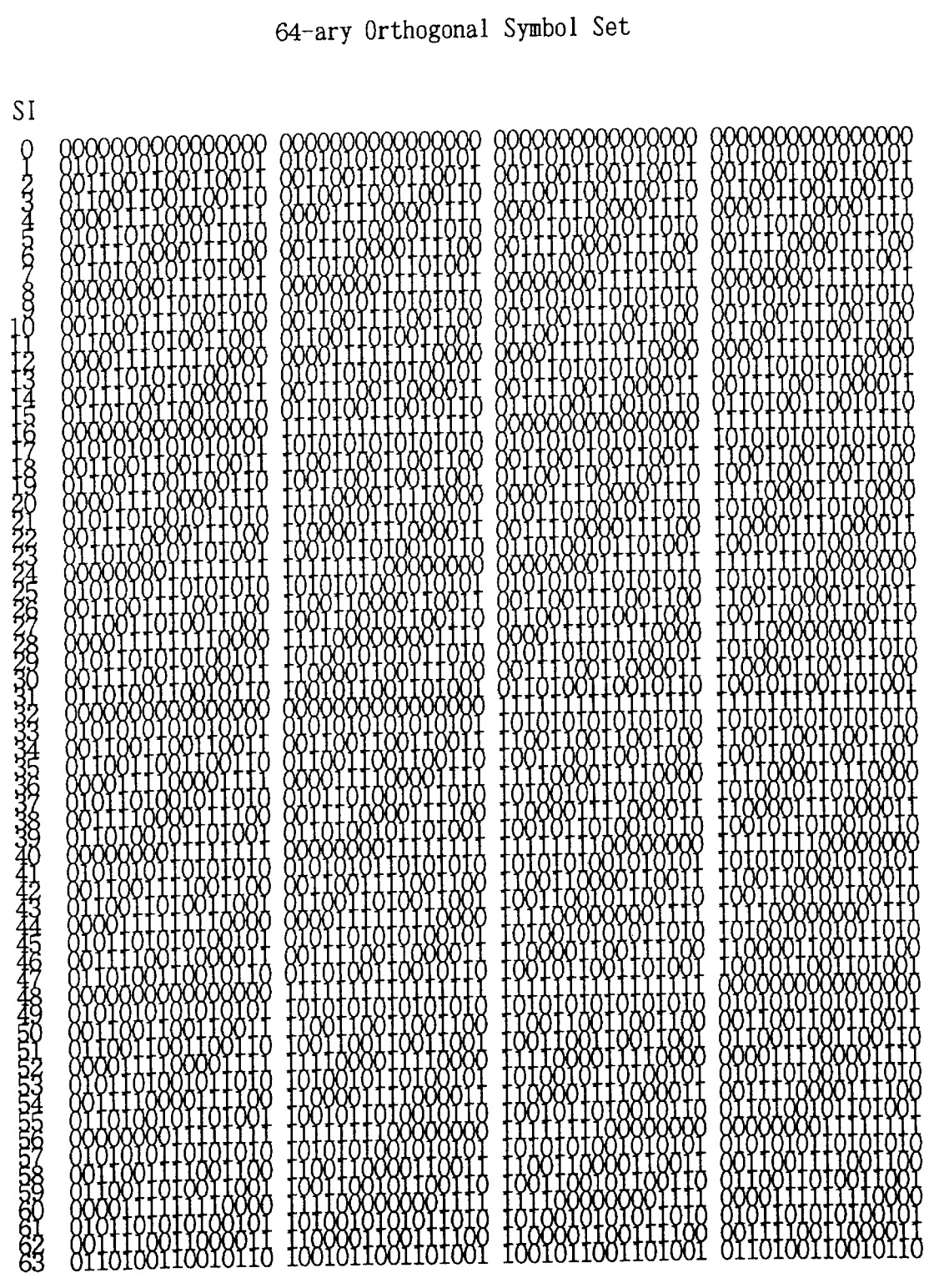

Then the transmitter 108 converts the six-bit converted data D5 to a Walsh code consisting of 64-bit orthogonal code corresponding to the symbol index SI based on the conversion table shown in FIG. 19, repeats the conversion processing of 576-bit coded data D16 for a single cycle (20 msec.) stored in the interleave memory 122A, six bits by 6 bits, in total 96 times, and then modulates the converted data using a predetermined method, and transmits the data at a predetermined radio transmission speed in a burst manner (consecutively). The transmitter 108 is so configured that it outputs the request signal RQ1 to the control section 150 whenever it performs conversion based on the supplied six-bit converted data D5.

Next, the interleave processing method using the interleave memory 122A of the interleaver 122 is described in detail for each transmission speed. As shown in FIG. 10, the transmission symbol series data D16 outputted from the convolutional coder 121 at a transmission speed of 9600 bps is sequentially written bit by bit in vertical direction from the first column at the leftmost position in the order of "1," "2," "3," etc., until "32," then "33," "34," etc. in the second column, etc., until finally "576" in the 18th column at the rightmost position, according to the write address information WA1 supplied from the controller 107.

Next, the transmit symbol series data D16 written in the interleave memory 122A is all read from the leftmost number in the first row at the uppermost position, in the order of "1," "33," "65," "97," "129," and "161," etc., until "545" in the 32nd row, according to the read address information RA1 supplied from the controller 107, while the latch circuit 122B is preserving the converted data D5.

Further, as shown in FIG. 20, the transmit symbol series data D16 output from the convolutional coder 121 at a transmission speed of 4800 bps is sequentially written bit by bit in vertical direction from the first column at the leftmost position in the order of "1," "2," "3," etc., until "16," then "17," "18," etc. in the second column, etc., until finally "288" in the 18th column at the rightmost position, according to the write address information WA1 supplied from the controller 107. In this case, the amount of the transmit symbol series data D16 is half that at a transmission speed of 9600 bps, thus reducing the capacity of the interleave memory 122A correspondingly.

Next, the transmit symbol series data D16 written in the interleave memory 122A is read from the leftmost number in the first row at the uppermost position, in the order of "1," "17," "33," "49," "65," "81," and the data in the first row is read again, then data is read twice every row until "288" in the 16th row, according to the read address information RA1 supplied from the controller 107.

Further, as shown in FIG. 21, the transmit symbol series data D16 outputted from the convolutional coder 121 at a transmission speed of 2400 bps is sequentially written bit by bit in vertical direction from the first column at the leftmost position in the order of "1," "2," "3," etc., until "8," then "9," "10," etc. in the second column, etc., until finally "144" in the 18th column at the rightmost position, according to the write address information WA1 supplied from the controller 107. In this case, the amount of the transmit symbol series data D16 when writing is one fourth that at a transmission speed of 9600 bps, thus reducing the capacity of the interleave memory 122A correspondingly.

Next, the transmit symbol series data D16 written in the interleave memory 122A is read from the leftmost number in the first row at the uppermost position, in the order of "1," "9," "17," "25," "33," "41," and further the data in the first row is read three times, finally data is read four times in every row until "144" in the eighth row, according to the read address information RA1 supplied from the controller 107.

Further, as shown in FIG. 22, the transmit symbol series data D16 outputted from the convolutional coder 121 at a transmission speed of 1200 bps is sequentially written bit by bit in vertical direction from the first column at the leftmost position in the order of "1," "2," . . . "4," and "5," "6," etc. in the second column, etc., until finally "72" in the 18th column at the rightmost position, according to the write address information WA1 supplied from the controller 107. In this case, the amount of the transmit symbol series data D16 is one eighth that at a transmission speed of 9600 bps, thus reducing the capacity of the interleave memory 122A correspondingly.

Next, the transmit symbol series data D16 written in the interleave memory 122A is read from the leftmost number in the first row at the uppermost position, in the order of "1," "5," "9," "13," "17," "21," and further the data in the first row is read seven times, finally data is read eight times in every row until "72" in the fourth row, according to the read address information RA1 supplied from the controller 107 wat the time of reading operation.

Figure 23:
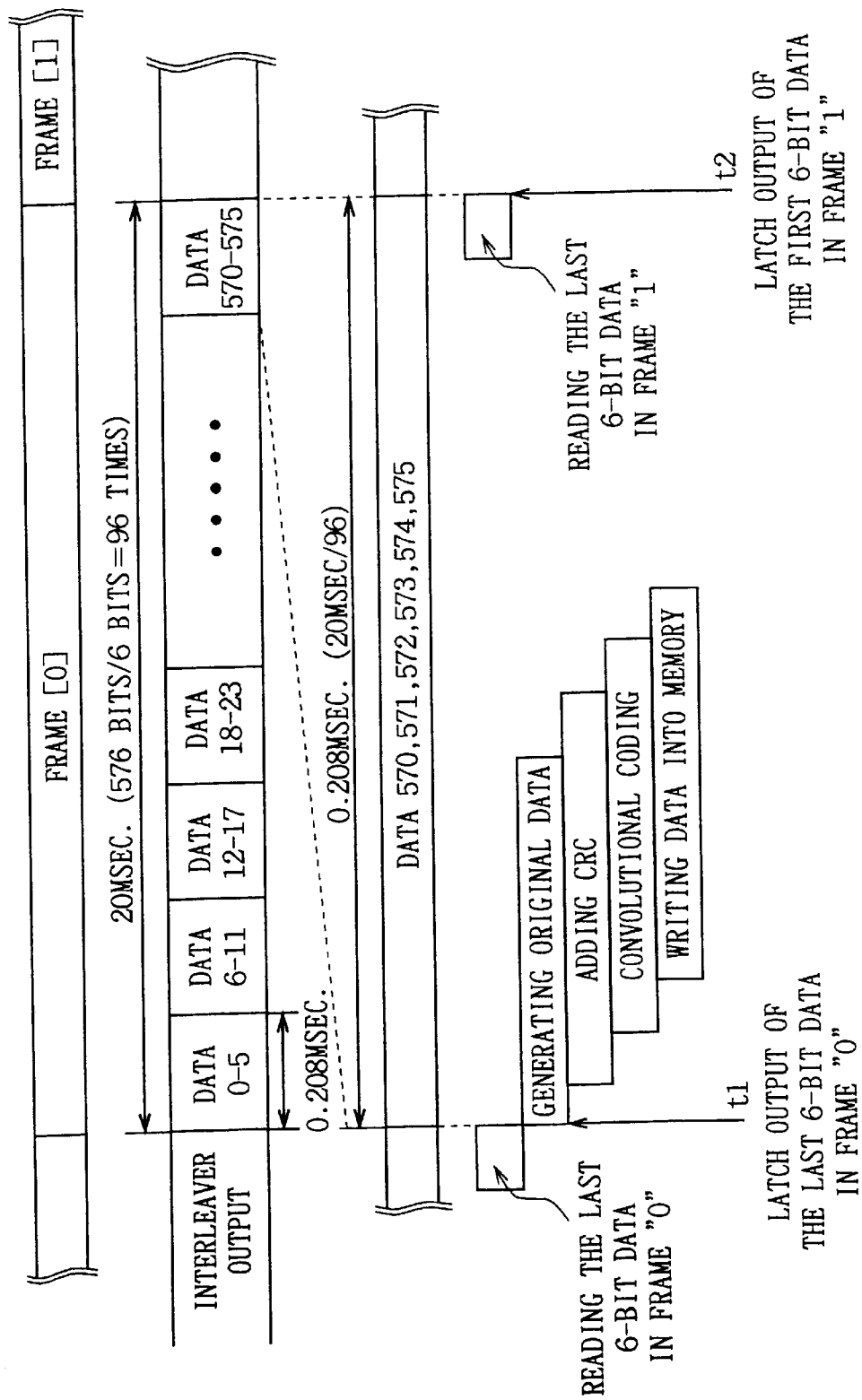
FIG. 23 is a simple diagram explaining a processing sequence in a controller.

Next the timing of write processing and read processing of transmit symbol series data D16 at the interleave memory 122A of the interleaver 122 is explained referring to FIG. 23.

The interleave memory 122A reads the last six-bit converted data D5 (read address: 570, 571, 572, 573, 574, 575) in frame "0" based on the clock CLK1 of 9.8 MHz, and outputs the last six-bit converted data D5 to the latch circuit 122B.

Once the latch circuit 122B preserves the last six-bit converted data D5 in frame "0," outputs the last six-bit converted data D5 to the transmitter 108 at the timing of time t1, based on the clock CLK2 of 4.8 kHz supplied from the control section 150, and keeps outputting the same converted data D50 until the timing of time t2 when the next clock CLK2 is supplied.

In this case, since the interleave memory 122A has read all of the one-cycle transmit symbol series data D16 in frame "0", the memory 122A can store 576-bit transmit symbol series data D16 in the next frame "1." Then the control section 150 switches from the read signal SR1 to the write signal WR1 without delay and moreover, outputs the write enable signal WE1 indicating the write enable state to the interleave memory 122A, and outputs the write address information WA1 at a transmission speed corresponding to the next frame "1" into the interleave memory 122A via the selector 151, based on the clock CLK1 of 9.8 MHz.

In this case, the control section 150 generates original data by reading the transmission control data D4 from the internal memory (not shown) of the controller 107 and adding the transmission control data D4 to the audio data D1, generates the code-added data D15 by adding the CRC code and/or tail bits to the original data, generates the transmission symbol series data D16 by applying the convolutional processing to the coded-added data D15, and writes the one-cycle (576 bits/20 msec.) transmit symbol series data D16, one bit by one bit at a processing speed of 9.8 MHz, to a predetermined position of the interleave memory 122A which is based on the write address information.

Here, since the processing from the time t1 when the last six-bit converted data D5 in frame "0" is outputted from the latch circuit 122B of the interleaver 122 to the transmitter 108 to time t2 when the first six-bit converted data D5 in the next frame "1" is outputted, is performed based on the clock CLK2 of 9.8 MHz, the corresponding processing time is 0.208 msec. (20 msec./96).

In this processing time of 0.208 msec., in the case of writing one-cycle transmit symbol series data D16 into the interleave memory 122A at a processing speed of 9.8 MHz, processing corresponding to 2038 ($9.8 \times 10^6 \times 0.208 \times 10^{-3}$) clocks can be executed. Therefore, at a transmission processing speed of 9600 bps, 576 times of write address information WA1 is required to write the transmit symbol series data D16 of 576-bit per cycle into the interleave memory 122A. However, since 2038 times of write address information WA1 can be output for the processing time of 0.208 msec., All of transmit symbol series data D16 of 576-bit per cycle can be written sufficiently fast.

Thus, since the control section 150 of the controller 107 can complete write processing of transmit symbol series data D16 of 576-bits per cycle within a time period of 0.208 msec. (20 msec./96) from the time when the control section 150 starts to output the last six-bit converted data D5 in frame "0" from the latch circuit 122B until the control section 150 starts to output the first six-bit converted data D5 in the next frame "1," the control section 150 can output the converted data D5 in the next frame uninterruptedly to the transmitter 108 without delay.

In the above configuration, the control section 150 of the controller 107 preserves the converted data D5 in frame "0" read from the interleave memory 122A at an operation speed of 9.8 MHz, six bits by six bits, using the latch circuit 122B, outputs the six-bit converted data D5 from the latch circuit 122B at a processing speed of 4.8 kHz, and writes the convolutional coded transmit symbol series data D16 into the interleave memory 122A at an operation speed of 9.8 MHz from the time t1 when the control section 150 outputs the last six-bit converted data D5 in frame "0" from the latch circuit 122B to time t2 when the control section 150 outputs the first six-bit converted data D5 in the next frame "1" from the latch circuit 122B. This allows the control section 150 to complete write processing of one-cycle transmit symbol series data D16 within a processing interval where the latch circuit 122B outputs the six-bit converted data D5.

Thus the control section 150 outputs the six-bit converted data D5 uninterruptedly to the transmitter 108 at an instant when frame "0" switches to frame "1" and moreover, performs write processing without increasing the memory capacity of the interleave memory 22, thus reducing the circuit scale.

Since the control section 150 uses the latch circuit 122B to preserve the converted data D5 six bits by six bits and outputs the converted data D5 at a operation speed of 4.8 kHz, unlike the case where the control section 150 of the controller 107 preserves and outputs the converted data D5 one bit by one bit, it is not required to speed the clock for writing the transmit symbol series data D16 over 9.8 MHz, thus saving consumed power.

According to the above configuration, the control section 150 of the controller 107 preserves, six bits by six bits, the converted data D5 into the latch circuit 122B, in which the converted data D5 is obtained by reading, in accordance with the predetermined read address information RA1, the transmit symbol series data D16 written in accordance with the predetermined write address information WA1, outputs the six-bit converted data D5 at an operation speed of 4.8 kHz, and writes the transmit symbol series data D16 into the interleave memory 122A at an operation speed of 9.8 MHz from the time t1 when the control section 150 of the controller 107 outputs the last six-bit converted data D5 in frame "0" from the latch circuit 122B to time t2 when the control section 150 outputs the first six-bit converted data D5 in the next frame "1." This allows the control section 150 of the controller 107 to write all of the one-cycle transmit symbol series data D16 in the next frame "1" within a processing interval where the latch circuit 122B sequentially outputs the six-bit converted data D5, thus eliminating the need for providing a plurality of interleave memories 122A and reducing the circuits size.

Note that, in the above embodiment, the transmitter 108 as modulation means converts the six-bit converted data D5 to a 64-bit Walsh code. However, the present invention is not limited to this embodiment but the number of bits of the converted data D5 outputted to the transmitter 108 can be converted into a variety number of bits other than six bits depending on the modulation method of the transmitter 108. For example, in the case of increasing the 8-bit converted data D5 to eight bits of data, the transmission time for the 8-bit converted data D5 exceeds 0.208 msec., allowing the one-cycle transmit symbol series data D16 to be written within an even more sufficient period and the frequency of the clock CLK to be lower, thus providing a lower consumed power.

Further, in the above embodiment, the control section 150 as control means operates the latch circuit 122B as preservation means by using the clock CLK2 of 4.8 kHz and operates the interleave memory 122A as storage means by using the clock CLK1 of 9.8 MHz. However, the present invention is not limited to this embodiment but any other operation speeds of clocks CLK1 and CLK2 can be selected as long as the operation speed of clock CLK1 is set to a higher value than that of clock CLK2 so that one-cycle transmit symbol series data D16 can be written within a time period from when the last six-bit converted data D5 in the current frame is outputted until the first six-bit converted data D5 in the next frame is outputted.

Furthermore, in the above embodiment, the coded data D16 is written once into the interleave memory 122A of the interleaver 122 at transmission speeds of 4800 bps, 2400 bps, and 1200 bps, and the coded data D16 is read repeatedly, twice, four times, or eight times so that the seemingly same 576-bit-length converted data as that at 9600 bps is read. However, the present invention is not limited to this embodiment but the data can be written repeatedly, twice, four times, and eight times respectively at transmission speeds of 4800 bps, 2400 bps, and 1200 bps, and all of the data can be read once in order in data reading.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A deinterleave unit for receiving transmitted signals, in which said transmitted signals are obtained by applying predetermined transmission processing to transmit data obtained by rearranging and outputting, for each frame, symbols of a transmit symbol series generated by coding original data, and for rearranging symbols of a received symbol series retrieved from said transmitted signals in an original order, said deinterleave unit comprising:

an address generator comprising:
first address data generating means for generating first address data at predetermined address intervals, wherein said first address data generating means includes a counter for counting up to a predetermined number and producing counter outputs and a carry output signal, and a multiplier for generating said first address data at said predetermined address intervals by multiplying each of said counter outputs by a predetermined value;

second address data generating means for generating second address data at said predetermined address intervals in synchronism with said carry output signal from said counter; and addition means for generating said addresses at said predetermined address intervals by sequentially adding said second address data to said first address data; and wherein said deinterleave unit further comprises control means for rearranging and outputting symbols of the received symbol series in the original order by sequentially assigning said addresses generated by said addition means to said received symbol series.

2. The deinterleave unit according to claim 1, wherein said control means comprises storage means for storing said received symbol series, writing means for writing said received symbol series into said storage means based on said addresses generated by said addition means, and reading means for reading said received symbol series in an order different from that of said addresses generated by said addition means.

3. The deinterleave unit according to claim 1, wherein said control means comprises storage means for storing said received symbol series, writing means for writing said received symbol series into said storage means in a predetermined write order, and reading means for reading said received symbol series based on said addresses generated by said addition means.

* * * * *